United States Patent
Tsuboi et al.

(10) Patent No.: US 10,022,028 B2
(45) Date of Patent: Jul. 17, 2018

(54) CLEANER

(71) Applicant: Sharp Kabushiki Kaisha, Osaka-shi, Osaka (JP)

(72) Inventors: Masanori Tsuboi, Osaka (JP); Jitsuo Sakamoto, Osaka (JP); Masashi Matsumoto, Osaka (JP); Mami Yatake, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 1038 days.

(21) Appl. No.: 14/372,046

(22) PCT Filed: Jan. 10, 2013

(86) PCT No.: PCT/JP2013/050334
§ 371 (c)(1),
(2) Date: Jul. 14, 2014

(87) PCT Pub. No.: WO2013/108709
PCT Pub. Date: Jul. 25, 2013

(65) Prior Publication Data
US 2015/0000068 A1 Jan. 1, 2015

(30) Foreign Application Priority Data
Jan. 17, 2012 (JP) ................. 2012-007547

(51) Int. Cl.
*A47L 11/40* (2006.01)
*A47L 9/28* (2006.01)
(Continued)

(52) U.S. Cl.
CPC ............... *A47L 9/2857* (2013.01); *A47L 7/04* (2013.01); *A47L 9/009* (2013.01); *A47L 9/19* (2013.01);
(Continued)

(58) Field of Classification Search
CPC ........ A47L 9/19; A47L 9/2847; A47L 9/2857; A47L 9/2852; A47L 2201/022; G05B 19/18; Y10S 901/01
See application file for complete search history.

(56) References Cited

U.S. PATENT DOCUMENTS 5,444,893 A * 8/1995 Hwang ............... A47L 5/12
15/319
7,459,871 B2 * 12/2008 Landry ............... A47L 9/2805
15/319
(Continued)

FOREIGN PATENT DOCUMENTS

| | | |
|---|---|---|
| CN | 101411601 A | 4/2009 |
| JP | 06-189877 A | 7/1994 |

(Continued)

OTHER PUBLICATIONS

Official Communication issued in International Patent Application No. PCT/JP2013/050334, dated Mar. 12, 2013.

*Primary Examiner* — Michael Jennings
(74) *Attorney, Agent, or Firm* — Keating & Bennett, LLP

(57) ABSTRACT

The self-propelled cleaner (1) of the present invention includes an event detecting section (101) for detecting an event which relates to cleaning and has occurred in the cleaner, a feeling selecting section (201) for selecting, from a plurality of options, an operation mode with which the cleaner carries out an operation in response to the event, in accordance with measured information which relates to the cleaning and is measured by the cleaner, and a response operation control section (301) for controlling the cleaner to carry out the operation based on the operation information which is associated with the event and the operation mode.

10 Claims, 33 Drawing Sheets

(51) Int. Cl.
*A47L 9/00* (2006.01)
*G05B 19/18* (2006.01)
*A47L 7/04* (2006.01)
*A47L 9/19* (2006.01)
*G05D 1/00* (2006.01)

(52) U.S. Cl.
CPC ............ *A47L 9/281* (2013.01); *A47L 9/2805* (2013.01); *A47L 9/2831* (2013.01); *A47L 9/2836* (2013.01); *A47L 9/2842* (2013.01); *A47L 9/2847* (2013.01); *A47L 9/2852* (2013.01); *A47L 9/2873* (2013.01); *A47L 9/2884* (2013.01); *A47L 11/4011* (2013.01); *G05B 19/18* (2013.01); *G05D 1/0088* (2013.01); *A47L 11/4055* (2013.01); *A47L 2201/00* (2013.01); *A47L 2201/022* (2013.01); *A47L 2201/04* (2013.01); *A47L 2201/06* (2013.01); *G05B 2219/45098* (2013.01); *G05D 2201/0203* (2013.01); *Y10S 901/01* (2013.01); *Y10S 901/40* (2013.01)

(56) References Cited

U.S. PATENT DOCUMENTS

| | | | | |
|---|---|---|---|---|
| 8,456,125 B2* | 6/2013 | Landry | ................ | A47L 9/2805 15/319 |
| 2005/0234611 A1* | 10/2005 | Uehigashi | ............ | G05D 1/0246 701/23 |

FOREIGN PATENT DOCUMENTS

| | | |
|---|---|---|
| JP | 2003-061882 A | 3/2003 |
| JP | 2005-118354 A | 5/2005 |
| JP | 2005-296512 A | 10/2005 |
| JP | 2008-264424 A | 11/2008 |

* cited by examiner

| PARAMETER | | FEELING OPERAND M1 | | |
|---|---|---|---|---|
| | | FEELING TYPE | CALM TYPE | TOLERANT TYPE |
| CLEANING NUMBER | LESS THAN 4 | −10 | −7 | −5 |
| | 4 OR MORE AND LESS THAN 7 | 10 | 7 | 5 |
| | 7 OR MORE | 20 | 14 | 10 |

(b)

574

| PARAMETER | | FEELING OPERAND M1 | | |
|---|---|---|---|---|
| | | FEELING TYPE | CALM TYPE | TOLERANT TYPE |
| CLEANING-DAY NUMBER | LESS THAN 4 DAYS | −20 | −14 | −10 |
| | 4 DAYS OR MORE AND LESS THAN 7 DAYS | 0 | 0 | 0 |
| | 7 DAYS | 20 | 7 | 10 |

FIG. 10

| | | | GOOD MOOD | NORMAL | BAD MOOD |
|---|---|---|---|---|---|
| EVENT INDICATING INSTRUCTION ON STARTING CLEANING | AUDIO OUTPUT OPERATION | | SENTENCE1 ("I SEE") OCCURRENCE RATIO: 95% | SENTENCE1 ("I SEE") OCCURRENCE RATIO: 2% | SENTENCE1 ("I SEE") OCCURRENCE RATIO: 1% |
| | | | SENTENCE2 ("YES") OCCURRENCE RATIO: 3% | SENTENCE2 ("YES") OCCURRENCE RATIO: 95% | SENTENCE2 ("YES") OCCURRENCE RATIO: 3% |
| | | | SENTENCE3 ("YES, YES") OCCURRENCE RATIO: 1% | SENTENCE3 ("YES, YES") OCCURRENCE RATIO: 2% | SENTENCE3 ("YES, YES") OCCURRENCE RATIO: 95% |
| | | | SILENCE OCCURRENCE RATIO: 1% | SILENCE OCCURRENCE RATIO: 1% | SILENCE OCCURRENCE RATIO: 1% |
| | DEVICE OPERATION | | SWIVELING 3 TIMES OCCURRENCE RATIO: 97% | SWIVELING 3 TIMES OCCURRENCE RATIO: 27% | SWIVELING 3 TIMES OCCURRENCE RATIO: 0% |
| | | | SWIVELING 2 TIMES OCCURRENCE RATIO: 3% | SWIVELING 2 TIMES OCCURRENCE RATIO: 96% | SWIVELING 2 TIMES OCCURRENCE RATIO: 3% |
| | | | NO SWIVELING OCCURRENCE RATIO: 0% | NO SWIVELING OCCURRENCE RATIO: 2% | NO SWIVELING OCCURRENCE RATIO: 97% |
| | SIDE BRUSH OPERATION | | 3 ROTATIONS OCCURRENCE RATIO: 10% | 3 ROTATIONS OCCURRENCE RATIO: 3% | 3 ROTATIONS OCCURRENCE RATIO: 0% |
| | | | 2 ROTATIONS OCCURRENCE RATIO: 5% | 2 ROTATIONS OCCURRENCE RATIO: 10% | 2 ROTATIONS OCCURRENCE RATIO: 5% |
| | | | NO ROTATION OCCURRENCE RATIO: 85% | NO ROTATION OCCURRENCE RATIO: 87% | NO ROTATION OCCURRENCE RATIO: 95% |
| | LIGHTING OPERATION | | BLINK1 GREEN, LIGHT AT 1-SECOND INTERVALS | BLINK2 GREEN, LIGHT AT 1-SECOND INTERVALS | BLINK3 GREEN, LIGHT AT 1-SECOND INTERVALS |
| EVENT INDICATING INSTRUCTION ON TERMINATING CLEANING | AUDIO OUTPUT OPERATION | | SENTENCE1 ("I SEE") OCCURRENCE RATIO: 95% | SENTENCE1 ("I SEE") OCCURRENCE RATIO: 2% | SENTENCE1 ("I SEE") OCCURRENCE RATIO: 1% |
| | | | SENTENCE2 ("YES") OCCURRENCE RATIO: 3% | SENTENCE2 ("YES") OCCURRENCE RATIO: 95% | SENTENCE2 ("YES") OCCURRENCE RATIO: 3% |
| | | | SENTENCE3 ("YES, YES") OCCURRENCE RATIO: 1% | SENTENCE3 ("YES, YES") OCCURRENCE RATIO: 2% | SENTENCE3 ("YES, YES") OCCURRENCE RATIO: 95% |
| | | | SILENCE OCCURRENCE RATIO: 1% | SILENCE OCCURRENCE RATIO: 1% | SILENCE OCCURRENCE RATIO: 1% |

FIG. 11

| CHARACTER | ELAPSED TIME | | | | |
|---|---|---|---|---|---|
| | LESS THAN 1 HOUR | 1 HOUR OR MORE AND LESS THAN 6 HOURS | 6 HOURS OR MORE AND LESS THAN 12 HOURS | 12 HOURS OR MORE AND LESS THAN 18 HOURS | 18 HOURS OR MORE |
| FEELING TYPE | 1 | 0.9 | 0.8 | 0.7 | 0.6 |
| CALM TYPE | 1 | 0.85 | 0.7 | 0.55 | 0.4 |
| TOLERANT TYPE | 1 | 0.8 | 0.6 | 0.4 | 0.2 |

FIG. 12

| ARITHMETICAL OPERATION RESULT | FEELING |
|---|---|
| M<−25 | BAD MOOD |
| −25≦M<25 | NORMAL |
| 25≦M | GOOD MOOD |

FIG. 17

| PARAMETER | | FEELING OPERAND M1 | | |
| --- | --- | --- | --- | --- |
| | | FEELING TYPE | CALM TYPE | TOLERANT TYPE |
| ELECTRIC CURRENT | LOWER THAN 1.4 A | −20 | −14 | −10 |
| | 1.4 A OR HIGHER AND LOWER THAN 1.6 A | 0 | 0 | 0 |
| | 1.6 A OR HIGHER | 20 | 14 | 10 |

| PARAMETER | | FEELING OPERAND M1 | | |
|---|---|---|---|---|
| | | FEELING TYPE | CALM TYPE | TOLERANT TYPE |
| ELAPSED TIME | LESS THAN 2 DAYS | 0 | 0 | 0 |
| | 2 DAYS OR MORE AND LESS THAN 5 DAYS | −5 | −3 | −2 |
| | 5 DAYS OR MORE | −10 | −7 | −5 |

| EVENT | FEELING OPERAND M1 578A | | |
|---|---|---|---|
| | FEELING TYPE | CALM TYPE | TOLERANT TYPE |
| AUDIO INPUT EVENT<br>COMMAND RECEIVING EVENT<br>INSTRUCTION INPUT EVENT | 7 | 6 | 5 |

FIG. 23

| EVENT | FEELING OPERAND M1 578B | | |
|---|---|---|---|
| | FEELING TYPE | CALM TYPE | TOLERANT TYPE |
| DETACHMENT EVENT | 10 | 7 | 5 |

FIG. 25

| EVENT | FEELING OPERAND M1 ||| 
|---|---|---|---|
| | FEELING TYPE | CALM TYPE | TOLERANT TYPE |
| RETURN SUCCESS EVENT | 20 | 14 | 10 |
| RETURN FAILURE EVENT | −20 | −14 | −10 |

578C

| | | FEELING OPERAND M1 | | |
|---|---|---|---|---|
| | | FEELING TYPE | CALM TYPE | TOLERANT TYPE |
| COLLIDE NUMBER | LESS THAN 30 | 0 | 0 | 0 |
| | 30 OR MORE AND LESS THAN 60 | −50 | −30 | −20 |
| | 60 OR MORE | −100 | −70 | −50 |

|  |  | FEELING OPERAND M1 | | |
|---|---|---|---|---|
|  |  | FEELING TYPE | CALM TYPE | TOLERANT TYPE |
| FALL-AVOID NUMBER | LESS THAN 4 | 0 | 0 | 0 |
|  | 4 OR MORE AND LESS THAN 7 | −50 | −30 | −20 |
|  | 7 OR MORE | −100 | −70 | −50 |

|   |   | FEELING OPERAND M1 | | |
|---|---|---|---|---|
|   |   | FEELING TYPE | CALM TYPE | TOLERANT TYPE |
| ODOR NUMBER | LESS THAN 3 | 0 | 0 | 0 |
|   | 3 OR MORE AND LESS THAN 5 | −50 | −30 | −20 |
|   | 5 OR MORE | −100 | −70 | −50 |

|  |  | FEELING OPERAND M1 | | |
|---|---|---|---|---|
|  |  | FEELING TYPE | CALM TYPE | TOLERANT TYPE |
| TEMPERATURE | LOWER THAN 13° C | −150 | −100 | −50 |
|  | 13° C OR HIGHER AND LOWER THAN 30° C | 0 | 0 | 0 |
|  | 30° C OR HIGHER | 150 | 100 | 50 |

582

CLEANER

TECHNICAL FIELD

The present invention relates to a cleaner and the like.

BACKGROUND ART

In recent years, a robot cleaner which automatically carries out cleaning is becoming popular among ordinary households. Moreover, recently, a robot cleaner has appeared which not only has a cleaning function but also operates with feelings. Patent Literature 1 discloses a self-propelled cleaner which (i) selects a feeling when it detects a human body and (ii) controls an operation of the cleaner in accordance with the selected feeling.

CITATION LIST

Patent Literature

[Patent Literature 1]
Japanese Patent Application Publication Tokukai No. 2005-296512 (Publication date: Oct. 27, 2005)

SUMMARY OF INVENTION

Technical Problem

According to the technique disclosed in Patent Literature 1, a feeling is randomly selected with the use of random numbers or a feeling is determined with the use of a sensor for selecting a feeling. However, such a technique has been obtained by merely applying, to a robot cleaner, a feeling determining method that has been used in a conventional robot device. In particular, the feeling does not reflect information relating to cleaning, and therefore expression of feelings does not make use of the fact of being the cleaner.

The present invention is accomplished in view of the problem, and its object is to provide a cleaner and the like that carry out an operation in accordance with a feeling which is based on information relating to cleaning.

Solution to Problem

In order to attain the object, a cleaner in accordance with an aspect of the present invention is a cleaner for carrying out cleaning and includes: event detecting means for detecting an event which relates to cleaning and has occurred in the cleaner; operation mode selecting means for selecting, from a plurality of options, an operation mode with which the cleaner carries out an operation in response to the event detected by the event detecting means, the operation mode selecting means selecting the operation mode in accordance with measured information which relates to the cleaning and is measured by the cleaner; an operation storage section in which the event, the operation mode, and operation information indicative of the operation are stored so that the event, the operation mode, and the operation information are associated with each other; and operation control means for controlling the cleaner to carry out the operation based on the operation information which is stored in the operation storage section while being associated with the event that has been detected by the event detecting means and with the operation mode that has been selected by the operation mode selecting means.

In order to attain the object, a cleaner in accordance with an aspect of the present invention is a cleaner for carrying out cleaning and includes: event detecting means for detecting an event which relates to cleaning and has occurred in the cleaner; operation mode selecting means for selecting, from a plurality of options, an operation mode with which the cleaner carries out an operation in response to the event detected by the event detecting means, the operation mode selecting means selecting the operation mode in accordance with the event; an operation storage section in which the event, the operation mode, and operation information indicative of the operation are stored so that the event, the operation mode, and the operation information are associated with each other; and operation control means for controlling the cleaner to carry out the operation based on the operation information which is stored in the operation storage section while being associated with the event detected by the event detecting means and with the operation mode selected by the operation mode selecting means.

Advantageous Effects of Invention

According to an aspect of the present invention, it is possible to bring about the following effect: that is, in a case where the operation mode is assumed as "feeling" of the cleaner, a response operation can be carried out in accordance with a feeling which has been selected based on information relating to cleaning.

Moreover, it is possible to bring about the following effect: that is, in a case where the operation mode is assumed as "feeling" of the cleaner, a response operation can be carried out in accordance with a feeling which has been selected based on an event relating to cleaning.

BRIEF DESCRIPTION OF DRAWINGS

FIG. 9 is a view schematically illustrating examples of data. (*a*) of FIG. 9 is an example of data stored in a cleaning number/operand storage section included in the storage section. (*b*) of FIG. 9 is an example of data stored in a cleaning-day number/operand storage section included in the storage section.
FIG. 10 is a view schematically illustrating an example of data stored in a response operation information storage section included in the storage section.
FIG. 11 is a view schematically illustrating an example of coefficients used by a feeling calculation section included in the control section.

FIG. 12 is a view schematically illustrating a correspondence between feelings and feeling values which have been obtained as a result of an arithmetical operation carried out by a feeling calculation section included in the control section.

FIG. 17 is a view schematically illustrating an example of data stored in an electric current/operand storage section included in the storage section.

FIG. 19 is a view schematically illustrating an example of data stored in an elapsed time/operand storage section included in the storage section.

FIG. 21 is a view schematically illustrating an example of data stored in an event/operand storage section included in the storage section.

FIG. 23 is a view schematically illustrating an example of data stored in an event/operand storage section included in the storage section.

FIG. 25 is a view schematically illustrating an example of data stored in an event/operand storage section included in the storage section.

FIG. 29 is a view schematically illustrating an example of data stored in a fall-avoid number/operand storage section included in the storage section.

FIG. 31 is a view schematically illustrating an example of data stored in an odor number/operand storage section included in the storage section.

FIG. 33 is a view schematically illustrating an example of data stored in a temperature/operand storage section included in the storage section.

DESCRIPTION OF EMBODIMENTS

[Overview of Present Invention]

Figure 1:
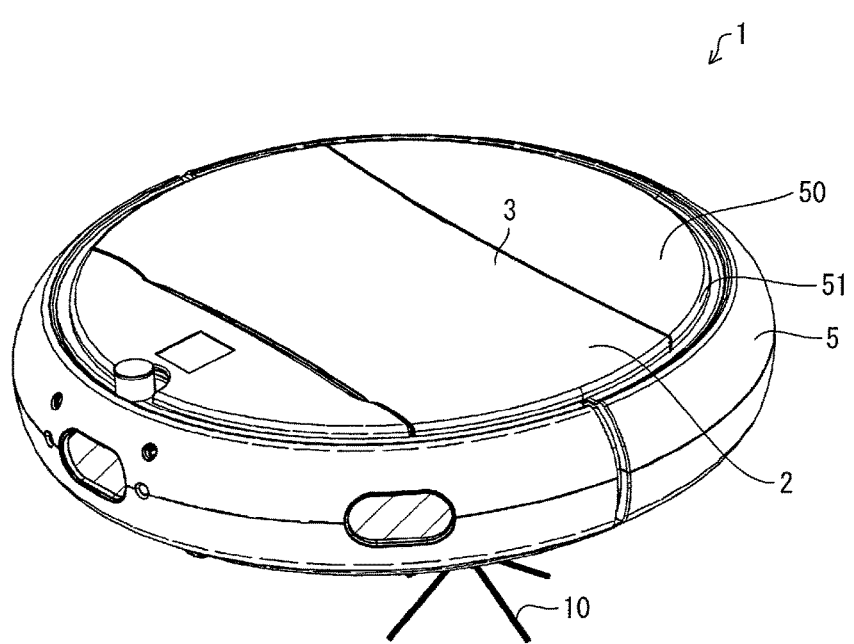
FIG. 1 is a perspective view of a self-propelled cleaner in accordance with an embodiment of the present invention.

A self-propelled cleaner 1 of the present invention is a device that carries out cleaning by sucking dust while traveling by itself. When an event (such as an instruction given to the self-propelled cleaner 1 on starting cleaning) which relates to cleaning occurs, the self-propelled cleaner 1 carries out an operation (hereinafter, referred to as "response operation") in response to the event. In this case, the self-propelled cleaner 1 is characterized mainly in that the self-propelled cleaner 1 determines an operation mode, with which a response operation is carried out, in accordance with (i) various information which relate to cleaning and can be measured by the self-propelled cleaner 1 or (ii) the event, and then the self-propelled cleaner 1 carries out the response operation in accordance with the operation mode thus determined.

The following description will discuss a case in which the operation mode is assumed as "feeling" of the self-propelled cleaner 1 which is personified. That is, the self-propelled cleaner 1 is assumed to determine a feeling in accordance with (i) various information which relate to cleaning and can be measured by the self-propelled cleaner 1 or (ii) the event, and then the self-propelled cleaner 1 carries out a response operation in accordance with the feeling thus determined.

Note that the feeling of the self-propelled cleaner 1 is determined by selecting from a plurality of options. In embodiments below, it is assumed that there are three options, i.e., "good mood" which is in a good mood, "normal" which is in a normal mood, and "bad mood" which is in a bad mood.

Typical examples of the response operation encompass the following (R1) through (R4) and combinations thereof. Note, however, that the response operation is not limited to those typical examples and can be any operation which can be viewed and heard by a user.

(R1) A predetermined audio is outputted (hereinafter, referred to as "audio output operation"). (R2) The self-propelled cleaner 1 is swiveled on a center line C by controlling driving wheels for self-propelling. (hereinafter, referred to as "device operation"). (R3) Side brushes for sweeping dust on a floor surface is rotated (hereinafter, referred to as "side brush operation"). (R4) A lighting section is turned on (hereinafter, referred to as "lighting operation").

Moreover, it is possible to employ a configuration in which a user can select a "character" of the self-propelled cleaner 1. Typical examples of the character encompass "feeling type" in which a feeling is kept long, "calm type" in which a feeling is kept moderately, and "tolerant type" in which a feeling is kept short. By selecting any of the types, the user can adjust, by preference, the length by which the feeling is kept.

Note that the present invention is not limited to the self-propelled cleaner and can be applied to a cleaner which does not travel by itself.

Embodiment 1

The following description will discuss one embodiment of the present invention in accordance with FIGS. 1 through 13.

(Configuration of Self-Propelled Cleaner)

Figure 2:
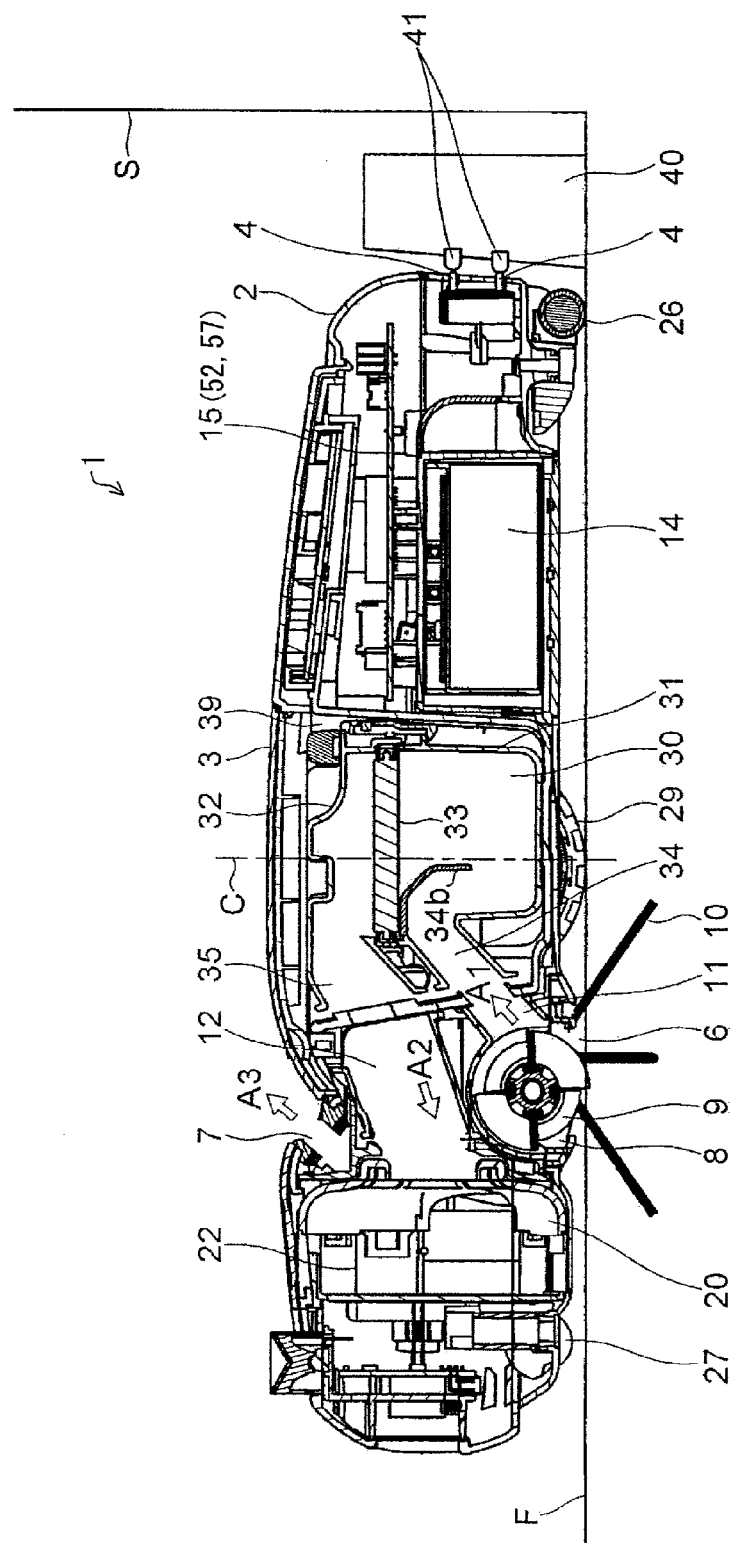
FIG. 2 is a lateral cross-sectional view of the self-propelled cleaner.
Figure 3:
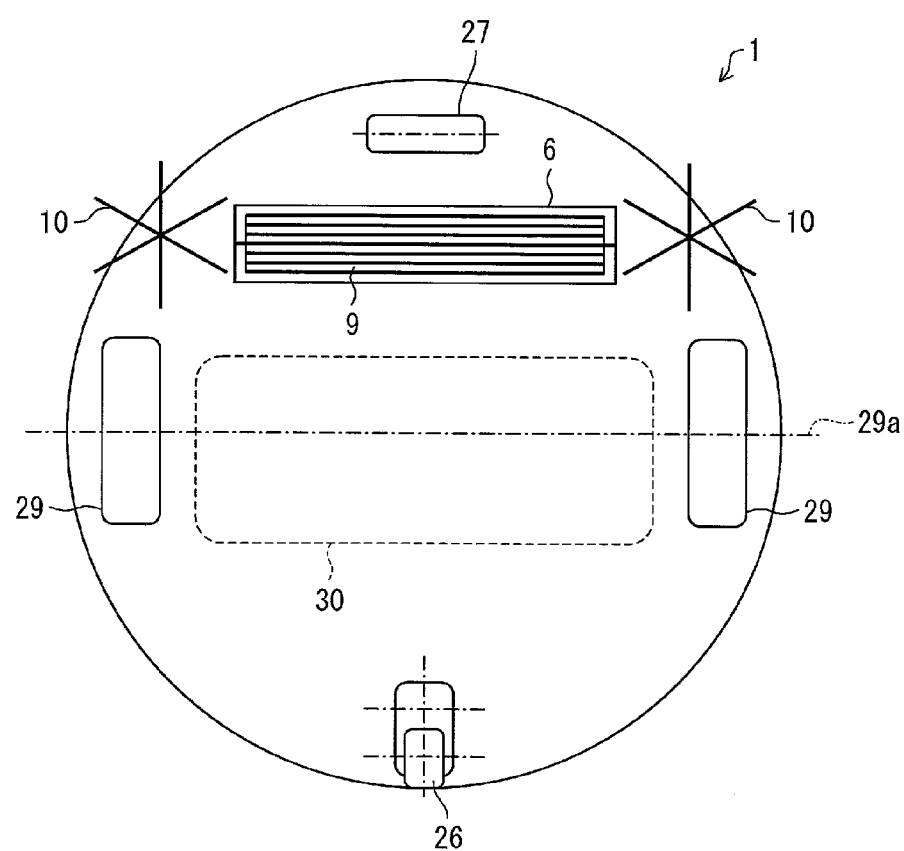
FIG. 3 is a view illustrating a bottom surface of the self-propelled cleaner.

FIGS. 1 through 3 is a perspective view, a lateral cross-sectional view, and a bottom surface view, respectively, each illustrating the self-propelled cleaner 1 of the present embodiment.

The self-propelled cleaner 1 includes (i) a main body housing 2 whose outer frame has a circular shape in a plan view (see FIG. 1) and (ii) driving wheels 29 which are driven with electric power supplied from a battery (secondary battery) 14 (see FIGS. 2 and 3). The self-propelled cleaner 1 is a device which collects dust (i.e., carries out cleaning) while traveling by itself.

The main body housing 2 has, on its upper surface, an operation panel 50 via which an instruction to the self-propelled cleaner 1 is inputted, an LED (light emitting diode) lamp 51, and a cover section 3 which opens or closes when a dust collection section 30 is detached or attached (see FIG. 1). According to the present embodiment, the main body housing 2 has the upper surface and the bottom surface which have the circular shape. Note, however, that the shape of the upper surface and the bottom surface is not limited to this.

According to the present embodiment, the LED lamp 51 is provided in a periphery of the upper surface of the main body housing 2, and a color and a pattern of lighting vary in accordance with a state of the self-propelled cleaner 1, as later described. Note that a lamp other than the LED can be provided. Alternatively, the LED lamp can be provided in the vicinity of an exhaust port 7 provided on the upper surface of the self-propelled cleaner 1.

The operation panel 50 has (i) an operation switch (operation section) via which data such as various instructions, letters, and numerals is entered by the user and (ii) a display (display section) for displaying various kinds of information toward the user. Alternatively, the operation panel 50 can be a touch panel. Alternatively, an indicator LED can be provided on the operation panel 50.

Figure 4:
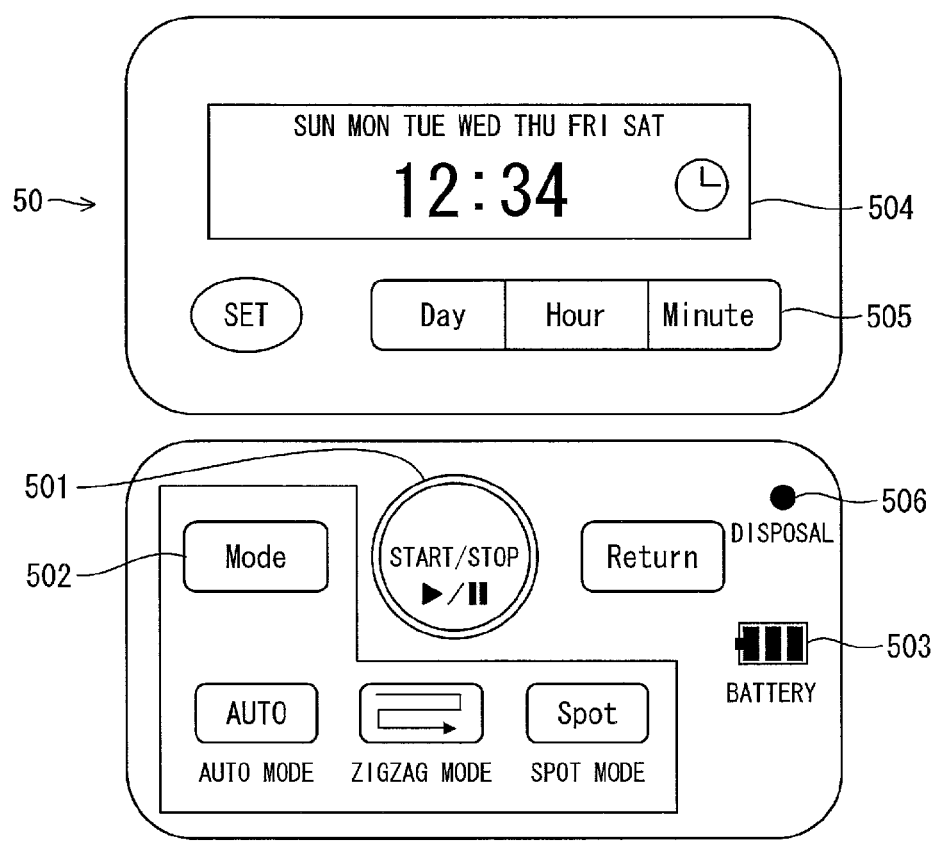
FIG. 4 is a view illustrating an example of an operation panel of the self-propelled cleaner.

FIG. 4 illustrates an example of the operation panel 50. The operation panel 50 illustrated in FIG. 4 includes a "start/stop button" 501 for instructing start/stop of cleaning, a "mode selection button" 502 for selecting a mode of cleaning, a "timer setting button" 505 for setting a current time and a programmed time at which the self-propelled cleaner 1 is operated, a time display section 504 for displaying a current time and a programmed time, and a disposal lamp 506 which is turned on when a dust collection container 31 (described later) is full. Moreover, the operation panel 50 has a "battery mark" 503 for indicating a remaining battery level of the battery 14 (secondary battery). These are merely examples, and the operation panel 50 can have an operation section and a display section for realizing functions other than those described above.

As illustrated in FIGS. 2 and 3, a pair of driving wheels 29 is provided in the bottom surface of the main body housing 2 such that the driving wheels 29 protrude from the bottom surface and rotate on a horizontal rotation axis 29a. The rotation axis 29a of the driving wheels 29 is located so as to extend across the center line C of the main body housing 2. When both the driving wheels 29 rotate in an identical direction, the self-propelled cleaner 1 goes forward or backward. When the driving wheels 29 rotate in opposite directions, the self-propelled cleaner 1 rotates on the center line C of the main body housing 2. The self-propelled cleaner 1 travels by itself with the driving wheels 29 which are driven by the battery 14. Hereinafter, a front traveling direction in which the self-propelled cleaner 1 travels by itself and carries out cleaning is referred to as "front", and a back traveling direction is referred to as "rear". A motion which is carried out in the traveling direction in which cleaning is carried out is referred to as "go forward", and a motion which is carried out in a direction opposite to the traveling direction is referred to as "go backward". On a peripheral surface (lateral surface) of the main body housing 2, a surface facing in the traveling direction in which cleaning is carried out is referred to as "front surface", and a surface located opposite to the front surface is referred to as "rear surface". The rear surface is a surface facing in a traveling direction in which the self-propelled cleaner 1 goes backward.

In a case where the main body housing 2 reaches a periphery of a cleaning area or collides with an obstacle in its path, the driving wheels 29 are stopped. Then, the driving wheels 29 rotate in opposite directions so that the self-propelled cleaner 1 swivels on the center line C of the main body housing 2. This makes it possible to cause the self-propelled cleaner 1 to travel by itself in an entire intended cleaning area while avoiding an obstacle. Note that the self-propelled cleaner 1 can be caused to go backward by reversing the rotation direction in which the driving wheels 29 rotate when the self-propelled cleaner 1 goes forward.

In the front of the bottom surface of the main body housing 2, a suction port 6 is provided. The suction port 6 (i) is an opening of a recessed part 8 which is provided on the bottom surface of the main body housing 2 and (ii) faces a floor surface F. In the recessed part 8, a rotation brush 9 is provided which rotates on a horizontal rotation axis. Moreover, side brushes 10, each of which rotates on a vertical rotation axis, are provided on both sides of the recessed part 8.

Further, a front wheel 27 having a roller shape is provided in front of the suction port 6 in the bottom surface of the main body housing 2. Further, a rear wheel 26, which is a caster wheel, is provided at a rear end part (i.e., rear end) in the bottom surface of the main body housing 2. In the self-propelled cleaner 1, weights are distributed in the front and the rear with respect to the driving wheels 29 provided in the center of the main body housing 2, and cleaning is carried out while the front wheel 27 is off from the floor surface F whereas the rotation brush 9, the driving wheels 29, and the rear wheel 26 are making contact with the floor surface F. This allows dust, which exists in the path of the self-propelled cleaner 1, to be led to the suction port 6 without being blocked by the front wheel 27. The front wheel 27 is configured to make contact with a step, which appears in the path of the self-propelled cleaner 1, such that the self-propelled cleaner 1 can easily go over the step.

A bumper 5 is provided on the periphery of the main body housing 2 so as to buffer impact and vibration to the self-propelled cleaner 1. When the self-propelled cleaner 1 detects that the bumper 5 has made contact with an obstacle while traveling, the self-propelled cleaner 1 changes the traveling direction and then continues to travel.

In the peripheral surface at the rear end of the main body housing 2, charge terminals 4 are exposed via which the battery 14 is charged. According to the present embodiment, two charge terminals 4 are provided in the peripheral surface at the rear end of the main body housing 2 such that the charge terminals 4 are arranged in a vertical direction. Note, however, that the number of the charge terminals 4 can be one, or three or more. After cleaning or a remaining battery level becomes lower than a predetermined level, the self-propelled cleaner 1 returns to a location at which a battery charging dock 40 is provided. Then, the self-propelled cleaner 1 connects the charge terminals 4 to power supply terminals 41, which are provided in the battery charging dock 40, so that the battery 14 is charged. The battery charging dock 40, which is connected with a commercial power source, is generally placed such that a rear surface (i.e., a surface which does not face the peripheral surface of the main body housing 2) of the battery charging dock 40 extends along a lateral wall S of a room. Details of the battery charging dock 40 will be described later.

The battery 14 is an electric power source for the entire self-propelled cleaner 1. The battery 14 is preferably a large capacity rechargeable battery that can be used and recharged repeatedly. Examples of such a large capacity rechargeable battery encompass a lead battery, a nickel-hydrogen battery, a lithium-ion battery, and a capacitor.

The main body housing 2 has the dust collection section 30 for collecting dust. The dust collection section 30 is provided above the rotation axis 29a of the driving wheels 29 and is contained in a dust collection chamber 39 provided in the main body housing 2. Since the dust collection section 30 is located above the rotation axis 29a, a weight balance of the main body housing 2 is maintained even when the weight is increased by collecting dust. The dust collection chamber 39 (i) is an isolated chamber having four peripheral surfaces and a bottom surface and (ii) extends in an axis direction of the rotation brush 9 so as to partition an inside of the main body housing 2. The wall surfaces of the dust collection chamber 39, except for a front wall surface extending in the axis direction of the rotation brush 9, do not have openings. The front wall surface of the dust collection chamber 39 has (i) a first air intake path 11 which communicates with the recessed part 8 and (ii) a second air intake path 12 which is located above the recessed part 8 and communicates with a motor unit 20 (motor).

Figure 5:
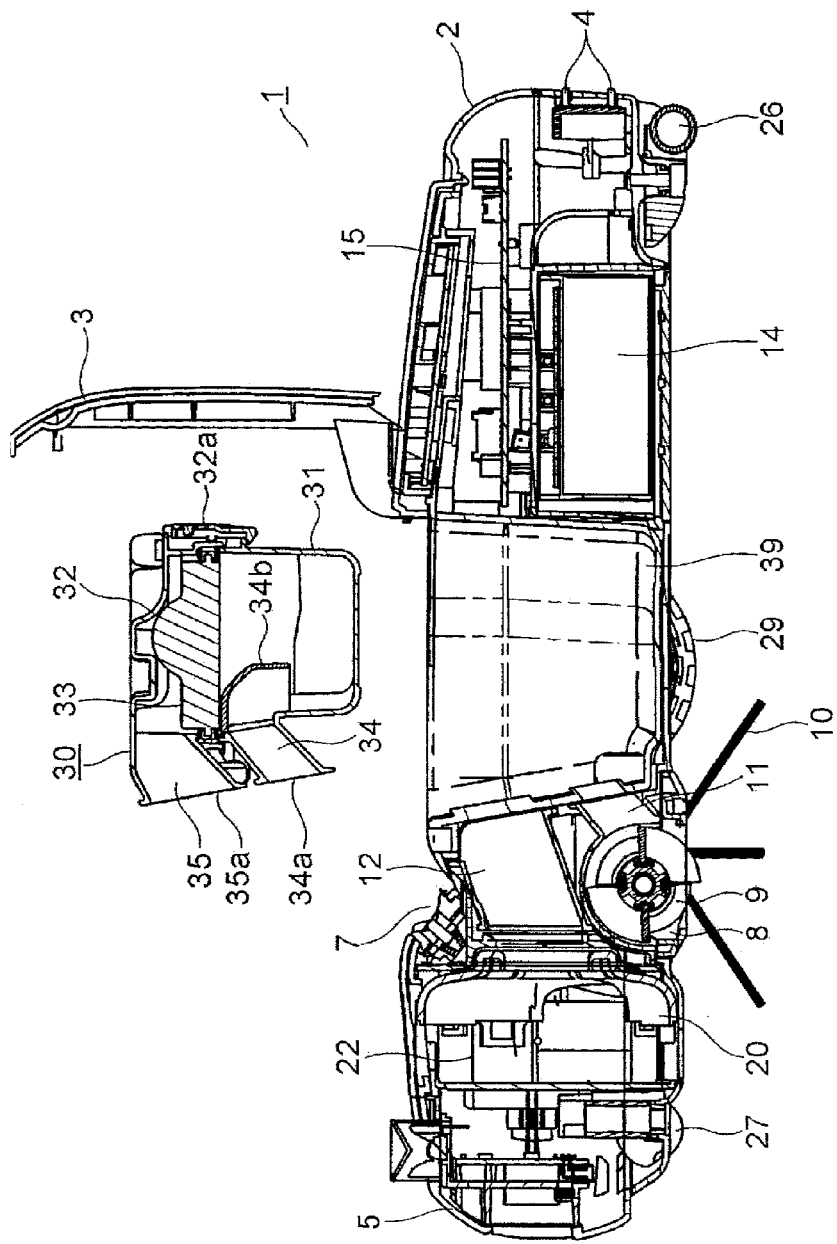
FIG. 5 is a lateral cross-sectional view of the self-propelled cleaner in which a cover section of a main body housing is opened and a dust collection section is detached.

The dust collection section 30 can be put in or taken out from the main body housing 2 by opening the cover section 3 of the main body housing 2 (see FIG. 5). The dust collection section 30 is made up of (i) a dust collection container 31 having a bottom surface and (ii) an upper cover 32 which has a filter 33 and is provided in an upper part of the dust collection container 31. The upper cover 32 is locked onto the dust collection container 31 with a locking section 32a which is movable, and the upper surface of the dust collection container 31 is opened or closed by handling the locking section 32a. With the configuration, it is possible to dispose of dust collected in the dust collection container 31.

The dust collection container 31 has an inflow path 34 which (i) is provided in a front part of a peripheral surface of the dust collection container 31 and (ii) communicates with the first air intake path 11 via an inflow opening 34a. Further, in the dust collection container 31, an inflow section 34b is provided which is connected with the inflow path 34 and is bent so that an incoming airflow goes downward. The upper cover 32 has an outflow path 35 which (i) is provided in a front part of a peripheral surface of the upper cover 32 and (ii) communicates with the second air intake path 12 via an outflow opening 35a.

In a periphery of each of the inflow opening 34a and the outflow opening 35a, a packing (not illustrated) is provided which hermetically contacts with the front wall of the dust collection chamber 39. This allows the dust collection chamber 39, which contains the dust collection section 30, to be sealed. A cross-section of the inflow opening 34a, a cross-section of the outflow opening 35a, and the front wall of the dust collection chamber 39 lie obliquely so that deterioration of the packing can be prevented, which deterioration may be caused by sliding of the dust collection section 30 being put in or taken out.

A control substrate 15 is provided in an upper part behind the dust collection chamber 39 in the main body housing 2. On the control substrate 15, a control section 52 (later described) and a storage section 57 (later described) are provided. The control section 52 controls the sections of the self-propelled cleaner 1, and the storage section 57 stores various kinds of data. In a lower part behind the dust collection chamber 39, the battery 14 is removably provided. The battery 14 is charged via the charge terminals 4 and the battery charging dock 40 and supplies electric power to the constituent members such as the control substrate 15, the driving wheels 29, the rotation brush 9, the side brushes 10, and an electric blower 22.

When an instruction on cleaning is given to the self-propelled cleaner 1 having the configuration above described, driving electric power is supplied from the battery 14 to the electric blower 22, an ion generator 62 (later described), the driving wheels 29, the rotation brush 9, and side brushes 10. This causes the rotation brush 9, the driving wheels 29, and the rear wheel 26 to make contact with the floor surface F so that the self-propelled cleaner 1 travels by itself in a predetermined cleaning area, and an airflow including dust on the floor surface F is sucked via the suction port 6. In this case, dust on the floor surface F is scraped up by rotation of the rotation brush 9 and led to the recessed part 8. Moreover, dust lateral to the suction port 6 is led to the suction port 6 by rotation of the side brushes 10.

The airflow sucked via the suction port 6 flows through the first air intake path 11 toward the rear as indicated by an arrow A1 of FIG. 2, and enters the dust collection section 30 via the inflow opening 34a. The airflow entered the dust collection section 30 passes through the filter 33 so that the dust is caught, and then flows out of the dust collection section 30 via the outflow opening 35a. As such, the dust is collected and stored in the dust collection container 31. The airflow flowed out of the dust collection section 30 flows through the second air intake path 12 toward the front as indicated by an arrow A2, and enters the electric blower 22 of the motor unit 20.

The airflow which has passed through the electric blower 22 is discharged obliquely upward (as indicated by an arrow A3) via the exhaust port 7 provided in the upper surface of the main body housing 2. Note that an ion generator (not illustrated) is provided in the vicinity of the electric blower 22 so that an airflow containing ions is discharged via the exhaust port 7.

As such, while the cleaning is carried out in the room, the ions contained in the air discharged from the traveling self-propelled cleaner 1 are dispersed across the room so that bacteria is eliminated and odor is removed. In this case, the air is discharged upward from the exhaust port 7, and it is therefore possible to prevent dust on the floor surface F from being raised. This makes it possible to improve cleanliness of the room.

The airflow, which contains ions and flows through the second air intake path 12, can be partially led to the recessed part 8. In such a configuration, ions are to be contained in an airflow led to the first air intake path 11 from the suction port 6. This makes it possible to eliminate bacteria and remove odor in the dust collection container 31 and the filter 33 of the dust collection section 30.

The battery charging dock 40 is a device for charging the battery 14 of the self-propelled cleaner 1 and includes, for example, a charge circuit for controlling charging of the battery 14.

Figure 6:
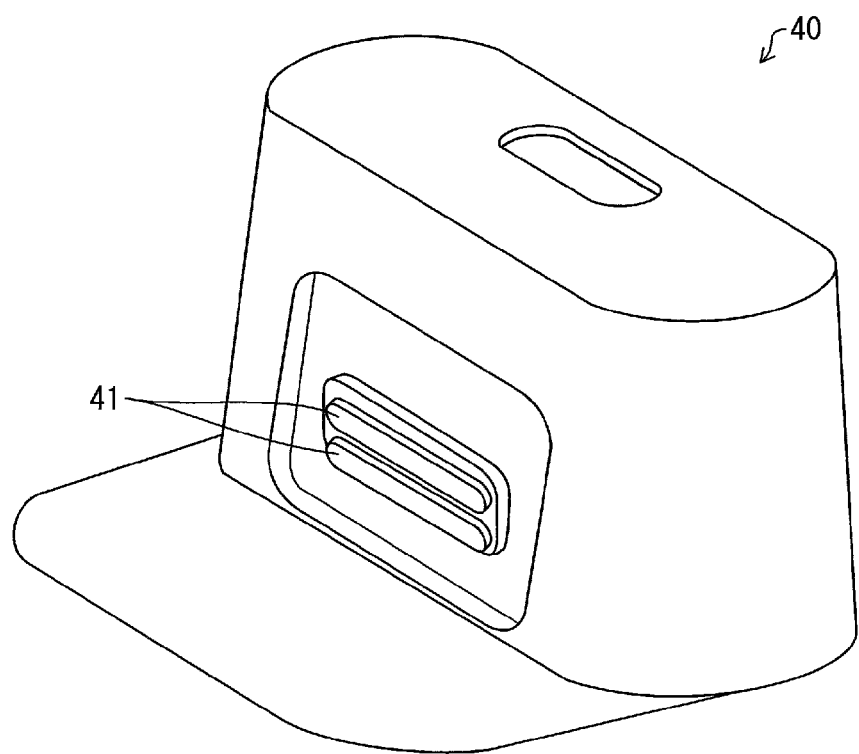
FIG. 6 is a perspective view of a battery charging dock for charging the self-propelled cleaner.
Figure 7:
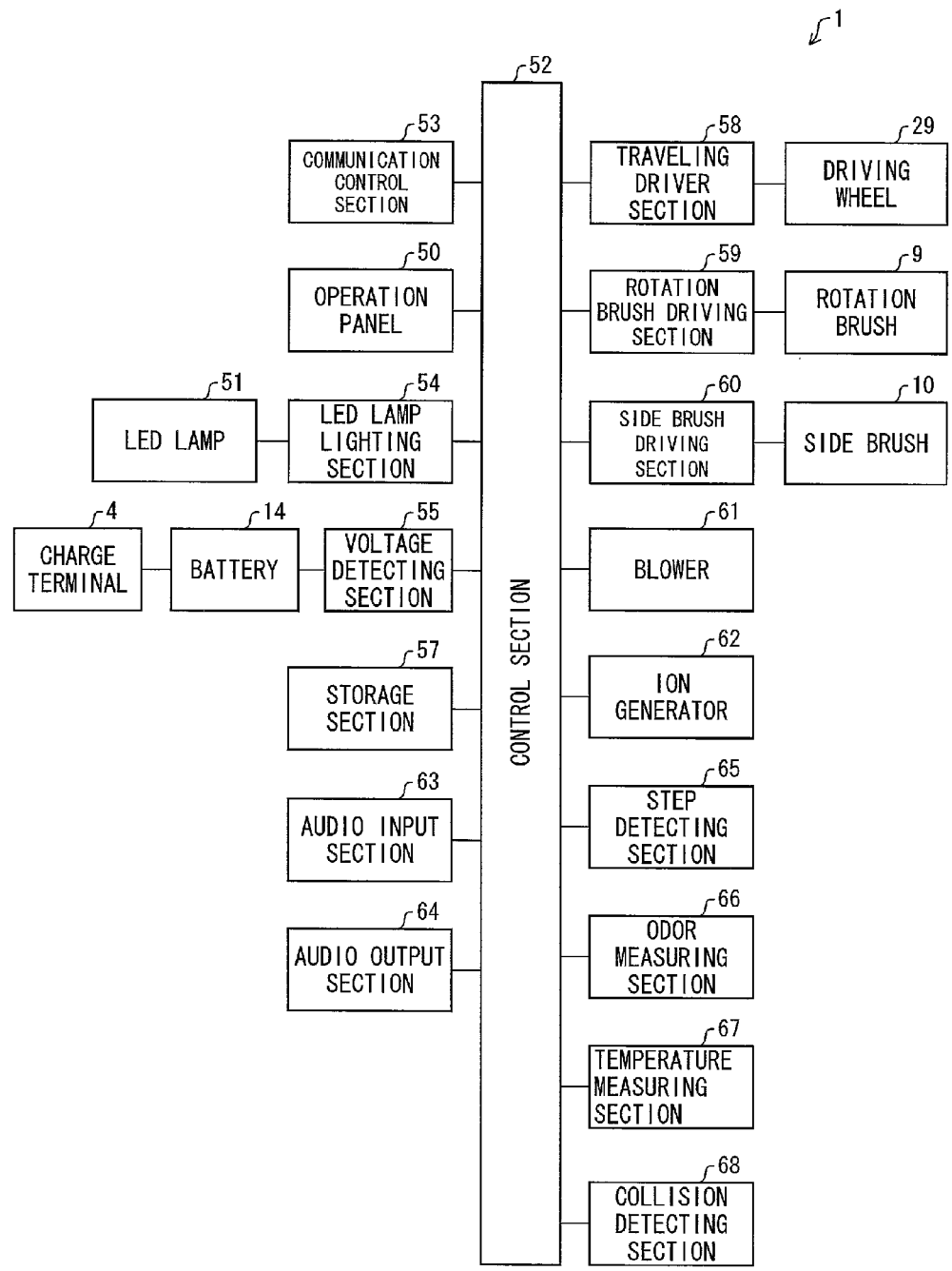
FIG. 7 is a block diagram illustrating a functional configuration of the self-propelled cleaner.
Figure 8:
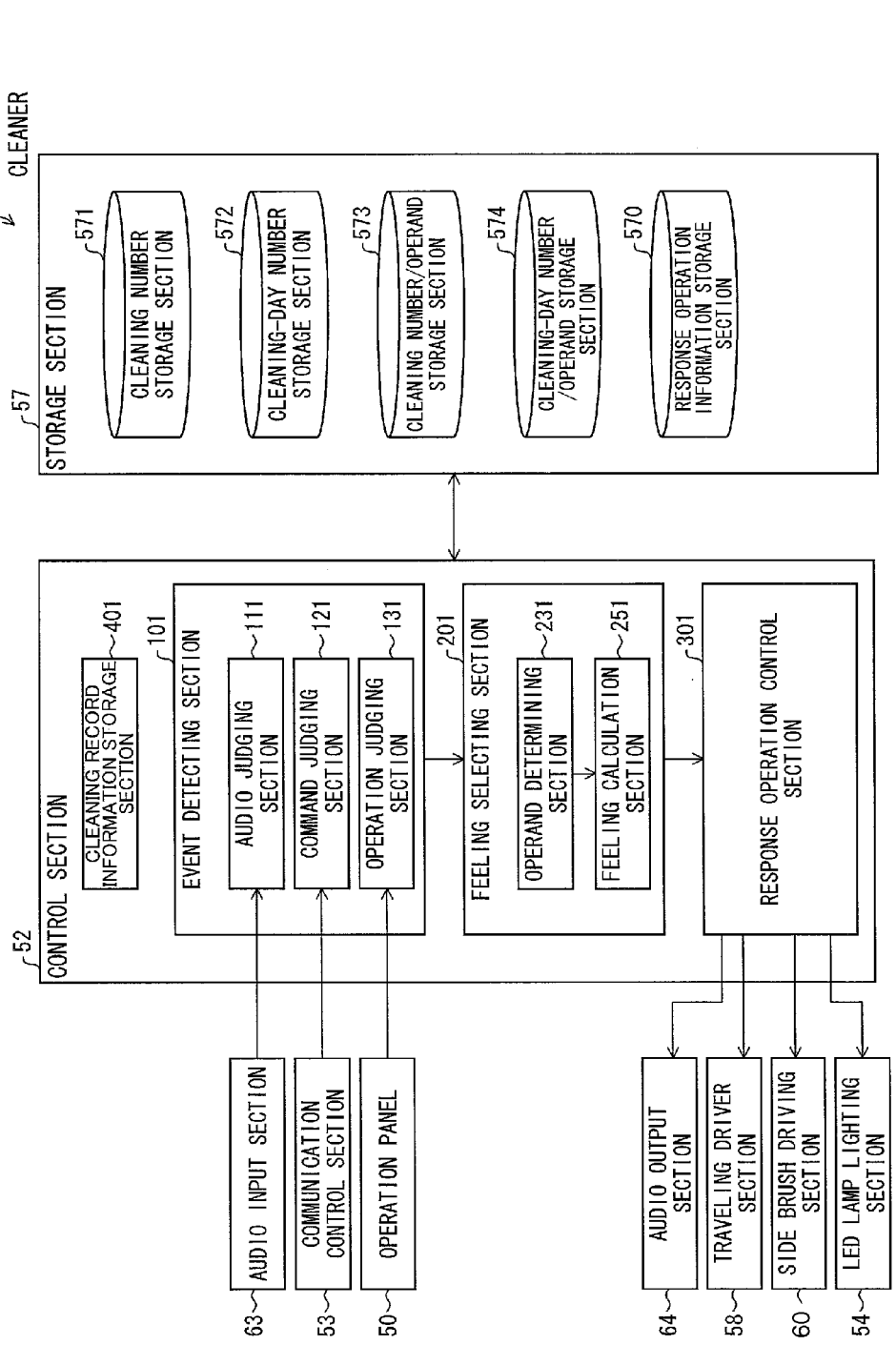
FIG. 8 is a block diagram illustrating a configuration of a storage section and a control section of the self-propelled cleaner.

In a front surface (i.e., a surface facing the peripheral surface of the main body housing 2) of the battery charging dock 40, the power supply terminals 41 whose number is identical with that of the charge terminals 4 of the self-propelled cleaner 1 are provided at a location at which the charge terminals 4 can make contact with the battery charging dock 40 (see FIG. 6). The power supply terminals 41 protrude from the front surface of the battery charging dock 40 in a state where nothing is in contact with the power supply terminals 41. Moreover, the power supply terminals 41 can be pushed to an extent that end faces of the power supply terminals 41 substantially flush with the front surface of the battery charging dock 40. When the end faces of the power supply terminals 41 are pushed in so as to substantially flush with the front surface of the battery charging dock 40 while the charge terminals 4 are (electrically) making contact with the power supply terminals 41, the battery charging dock 40 is electrically connected with the self-propelled cleaner 1 via the contact point and therefore an electric current from the commercial power source, which is connected with the battery charging dock 40, is supplied to the self-propelled cleaner 1. During this state, the battery 14 can be charged.

The battery charging dock 40 is configured to emit a return signal which indicates (i) a location at which the battery charging dock 40 is placed and (ii) a location of the power supply terminals 41. When the self-propelled cleaner 1 detects (i) completion of cleaning or (ii) that the remaining battery level of the battery 14 is lower than the predetermined level, the self-propelled cleaner 1 detects the return signal emitted from the battery charging dock 40 and automatically returns to the location at which the battery charging dock 40 is placed. Here, the self-propelled cleaner 1 can detect the completion of cleaning by, for example, (i) detecting that the self-propelled cleaner 1 has moved by a predetermined distance or that a predetermined time period has elapsed or (ii) detecting a cleaned state of the cleaning area with a sensor or the like. Alternatively, the self-propelled cleaner 1 can detect the completion of cleaning by accepting an instruction, such as a cleaning termination instruction or a cleaning pause instruction, which (i) prompts the self-propelled cleaner 1 to return to the battery charging dock 40 and (ii) is given to the self-propelled cleaner 1 (a) via the operation panel 50 or (b) from a remote controller or a terminal device connected with the self-propelled cleaner 1 via wireless communication.

According to the present embodiment, an infrared signal is emitted as the return signal which indicates the location of the battery charging dock 40 and the location of the power supply terminals 41. Note, however, that a signal other than the infrared signal can be emitted. The return signal is constantly emitted while the battery charging dock 40 is connected with the commercial power source and the self-propelled cleaner 1 is off from the battery charging dock 40.

According to the present embodiment, when the self-propelled cleaner 1 has detected a return signal, the self-propelled cleaner 1 goes forward (in other words, moves while the front surface faces in the traveling direction) to the vicinity of the location at which the battery charging dock 40 is placed. Then, the self-propelled cleaner 1 temporarily stops and swivels on the center line C of the main body housing 2 until the charge terminals 4 face the power supply terminals 41. After that, the main body housing 2 starts to go backward (in other words, move while the rear surface faces in the traveling direction). After the charge terminals 4 make contact with the power supply terminals 41, the self-propelled cleaner 1 further goes backward to a location (i.e., a location at which pushing-in of the power supply terminals 41 stops; a docking location) at which the end faces of the power supply terminals 41, which are in contact with the charge terminals 4, substantially flush with the front surface of the battery charging dock 40. Then, the self-propelled cleaner 1 detects electric power supplied via the power supply terminals 41 and therefore stops going backward. During this stopped state, charging is carried out. Note that processes relating to (i) returning of the self-propelled cleaner 1 and (ii) docking of the charge terminals 4 with the power supply terminals 41 (i.e., docking of the self-propelled cleaner 1 with the battery charging dock 40) can be carried out with the use of a known technique.

The docking of the charge terminals 4 with the power supply terminals 41 can be carried out, for example, as follows: a rear sensor is provided in the rear surface (rear end) of the main body housing 2 and the self-propelled cleaner 1 goes backward while the rear sensor detects the return signal. While the rear sensor does not detect the return signal, the self-propelled cleaner 1 slightly rotates on the center line C of the main body housing 2 in a normal direction (clockwise) or in a reverse direction (anticlockwise) until the return signal is detected, and then the self-propelled cleaner 1 goes backward. As such, the main body housing 2 goes backward while constantly detecting the return signal, and this allows the charge terminals 4 to be aligned with the power supply terminals 41.

Note that both the rear sensor and the charge terminals 4 are preferably provided on a line which extends in parallel with the rotation axis 29a of the driving wheels 29. Such a configuration allows the self-propelled cleaner 1 to go backward while the rear sensor detects the return signal from the battery charging dock 40, and it is therefore possible to appropriately connect the charge terminals 4 with the power supply terminals 41.

The self-propelled cleaner 1 can be configured such that the electric blower 22 and the ion generator are set to be driven while the charge terminals 4 are connected with the power supply terminals 41, i.e., during charging of the battery and after the charging is completed. In such a configuration, an airflow containing ions is discharged obliquely upward via the exhaust port 7 during and after the charging. Since the charge terminals 4 are provided in the rear end of the main body housing 2, the airflow containing ions flows toward the battery charging dock 40. Here, in a case where the rear surface of the battery charging dock 40 extends along the lateral wall S of the room, the airflow containing ions flows upward along the lateral wall S. Further, the airflow flows along a ceiling and a lateral wall facing the lateral wall S in the room. Accordingly, the ions are dispersed across the entire room, and it is therefore possible to improve the effects of eliminating bacteria and of removing odor.

It is possible to employ a configuration in which the self-propelled cleaner 1 includes an environment detecting section for detecting a state of surrounding environment, and an airflow containing ions is discharged via the exhaust port 7 while the self-propelled cleaner 1 remains at a predetermined location for a predetermined time period based on the state of surrounding environment detected by the environment detecting section.

According to the present embodiment, the self-propelled cleaner 1 is configured to be controlled not only via the operation panel 50 which is provided on the self-propelled cleaner 1 but also via a remote controller (not illustrated) utilizing infrared communication such as IrDA or IrSS (Registered Trademark). Moreover, the self-propelled cleaner 1 is also configured to be controlled via a terminal device (not illustrated) such as a smart phone which is connected with the self-propelled cleaner 1 via wireless communication such as Bluetooth (Registered Trademark), WiFi (Registered Trademark), or ZigBee (Registered Trademark). Furthermore, the self-propelled cleaner 1 is configured to transmit data to the terminal device via the wireless communication. That is, the self-propelled cleaner 1 and the terminal device, which is connected with the self-propelled cleaner 1 via radio waves, can carry out two-way communication with each other. The self-propelled cleaner 1 can be connected with a wide-area wireless network. In this case, it is possible to operate the self-propelled cleaner 1 via a terminal device which is connected with the wide-area wireless network.

The self-propelled cleaner 1 can be configured to accept an input operation made by audio. Moreover, the self-propelled cleaner 1 can be configured to output audio data which is stored in the self-propelled cleaner 1.

The self-propelled cleaner 1 includes various sensors so as to travel while avoiding an obstacle and without falling from a step or from stairs. Examples of the sensors encompass a cliff sensor (step detecting sensor), an obstacle detecting sensor, a motion sensor (human detection sensor), and a CCD (Charge-Coupled Device) camera. These are merely examples, and the self-propelled cleaner 1 does not need to include all the sensors. Each of the cliff sensor and the human detecting sensor can be configured by, for example, an infrared sensor, and the obstacle detecting sensor can be configured by, for example, an ultrasonic sensor.

The self-propelled cleaner 1 can include, for example, an acceleration sensor, a distance detecting sensor, and an angle sensor so as to control cleaning operation. The self-propelled cleaner 1 can include a temperature measuring section and an odor measuring section (as later described) so as to be controlled to carry out cleaning, ion-discharge, and the like in accordance with measurement results.

According to the present embodiment, the self-propelled cleaner 1 is described as a suction type cleaner. Note, however, that the self-propelled cleaner 1 can be applied also to, for example, a mop type cleaner. Moreover, the self-propelled cleaner 1 can be a cleaner for professional use, as well as for home use.

According to the present embodiment, the self-propelled cleaner 1 includes the ion generator 62. Note, however, that the ion generator 62 is not an essential element.

(Functional Configuration of Self-Propelled Cleaner)

The following description will discuss a functional configuration of the self-propelled cleaner 1. The self-propelled cleaner 1 includes a control section 52, a communication control section 53 (communication control means), an operation panel 50, an LED lamp lighting section 54, an LED lamp 51, a voltage detecting section 55, charge terminals 4, a battery 14, a storage section 57, a traveling driver section 58, a rotation brush driving section 59, a rotation brush 9, a side brush driving section 60, side brushes 10, driving wheels 29, a blower 61, an ion generator 62, an audio input section 63, an audio output section 64, a step detecting section 65, an odor measuring section 66, a temperature measuring section 67, and a collision detecting section 68 (see FIG. 7). The constituent members which have already been described will not be repeatedly explained below.

The control section 52 is a block for controlling operations of the self-propelled cleaner 1 based on programs and data stored in the storage section 57 and on programs and data inputted via the operation panel 50, the remote controller, or the terminal device connected with the self-propelled cleaner 1 via wireless communication. The control section 52 is provided on the control substrate 15.

The communication control section 53 is a block for controlling transmission/acceptance of data between the self-propelled cleaner 1 and an external device. The communication control section 53 receives, from the remote controller or the terminal device, a control signal for controlling the self-propelled cleaner 1. Moreover, the communication control section 53 transmits, to the terminal device, data stored in the self-propelled cleaner 1 or data which has been measured by the self-propelled cleaner 1. Furthermore, the communication control section 53 receives a return signal from the battery charging dock 40.

The LED lamp lighting section 54 is a block for supplying a driving electric current to the LED lamp 51 so as to control lighting of the LED lamp 51. The LED lamp lighting section 54 changes a color and a pattern of lighting in accordance with a state of the self-propelled cleaner 1. For example, the LED lamp lighting section 54 can change a color and a pattern of lighting depending on modes such as a cleaning mode in which cleaning is carried out, a charging mode in which charging is carried out, an ion generating mode in which ions are generated without carrying out cleaning (generation of ions will be described later), and an emergency mode in which an emergency occurs.

The voltage detecting section 55 is a block for detecting a voltage of the battery 14 and obtains a remaining battery level of the battery 14 from a detected voltage. The battery 14 is configured to be electrically connected with the charge terminals 4.

The storage section 57 stores (1) control programs executed by the control section 52 of the self-propelled cleaner 1, (2) an OS program executed by the control section 52, (3) application programs for the control section 52 to realize the functions of the self-propelled cleaner 1, (4) various data which are read out when the application programs are executed, and (5) data used in arithmetical operations carried out by the control section 52 for realizing the functions, arithmetical operation results, and the like. For example, the pieces of data of the above (1) through (4) are stored in nonvolatile storage devices such as a ROM (read only memory), a flash memory, an EPROM (Erasable Programmable ROM), an EEPROM (Registered Trademark) (Electrically EPROM), and an HDD (Hard Disc Drive). For example, the pieces of data of the above (5) are stored in a volatile storage device such as a RAM (Random Access Memory).

Moreover, the storage section 57 stores various condition settings for operating the self-propelled cleaner 1, which settings have been accepted via the operation panel 50 or accepted from the remote controller or the terminal device via the communication control section 53. The storage section 57 can further store a traveling map around a location at which the self-propelled cleaner 1 is placed. The traveling map is information relating to traveling such as a traveling course and a traveling speed of the self-propelled cleaner 1. Alternatively, the traveling map is information relating to an area to be cleaned. The traveling map can be stored in the storage section 57 in advance by the user. Alternatively, the self-propelled cleaner 1 can be configured to automatically record the traveling map.

The traveling driver section 58 is a block that includes a motor driver, a driving wheel motor, and the like and drives the driving wheels 29 by determining conditions such as a rotation direction and a rotation angle based on a control signal supplied from the control section 52.

The rotation brush driving section 59 is a block that includes a motor driver, a rotation brush motor, and the like and drives the rotation brush 9 by determining a condition such as a rotation speed based on a control signal supplied from the control section 52.

The side brush driving section 60 is a block which includes a motor driver, side brush motors, and the like and drives the side brushes 10 by determining a condition such as a rotation speed based on a control signal supplied from the control section 52.

The blower 61 corresponds to the motor unit 20 and includes the electric blower 22 and the like. The blower 61 sucks air into the main body housing 2 and discharges air from inside of the main body housing 2.

The ion generator 62 is a device for generating ions under control by the control section 52. According to the present embodiment, the ion generator 62 is assumed to be a plasma cluster ion (Registered Trademark) generator. The ion generator 62 includes a plasma cluster ion generating element, and the plasma cluster ion generating element has a positive ion generating section for generating positive ions and a negative ion generating section for generating negative ions. Note that details of such an ion generating element are disclosed in Japanese Patent Application Publication Tokukai No. 2002-58731, which was previously filed by the applicant of the subject application.

The ions generated by the ion generator 62 are discharged out of the main body housing 2 by the blower 61. Note that the self-propelled cleaner 1 can carry out cleaning operation and ion-generating operation simultaneously, by the control from the control section 52. Moreover, the self-propelled cleaner 1 can also carry out cleaning operation and ion-generating operation separately, by the control from the control section 52.

The audio input section 63 is an audio input device such as a microphone. Via the audio input section 63, external audio can be inputted to the self-propelled cleaner 1.

The audio output section 64 is an audio output device, such as a speaker, which outputs audio to the outside in accordance with audio data stored in the storage section 57.

The step detecting section 65 is a sensor, such as a cliff sensor, for detecting a step existing on a surface on which the self-propelled cleaner 1 travels.

The odor measuring section 66 is an odor sensor, such as a gas sensor, for measuring odor around the self-propelled cleaner 1.

The temperature measuring section 67 is a temperature sensor, such as a thermistor, for measuring a temperature around the self-propelled cleaner 1.

The collision detecting section 68 is a contact sensor for detecting that the bumper 5 has collided with an obstacle.

Next, the following description will discuss configurations of the storage section 57 and the control section 52 with reference to FIGS. 8 through 12.

(Configuration of Storage Section)

The storage section 57 includes a cleaning number storage section 571, a cleaning-day number storage section 572, a cleaning number/operand storage section 573, a cleaning-day number/operand storage section 574, and a response operation information storage section 570 (operation storage section).

The cleaning number storage section 571 stores, for each day, the number of times of cleaning (hereinafter, referred to as "cleaning number") carried out by the self-propelled cleaner 1. The cleaning-day number storage section 572 stores, for each day, whether or not the self-propelled cleaner 1 has carried out cleaning. Note that, even in a case where plural times of cleaning are carried out on one day, information stored in the cleaning-day number storage section 572 merely indicates the fact that cleaning was carried out on the day. The pieces of data stored in the cleaning number storage section 571 and the cleaning-day number storage section 572 are updated by a cleaning record information storage section 401 (later described).

The self-propelled cleaner 1 can carry out cleaning in cleaning modes (N1) through (N4) below. Each of the cleaning number storage section 571 and the cleaning-day number storage section 572 can store data either for each of the cleaning modes or without distinguishing the cleaning modes.

(N1) A mode in which an entire area, which can be cleaned, is cleaned (auto mode). (N2) A mode in which a predetermined area is cleaned (spot 1 mode). (N3) A mode in which a predetermined area, which is different from that of the spot 1 mode, is cleaned (spot 2 mode). (N4) A mode in which an area near to walls is cleaned (near-wall mode).

The pieces of data stored in the cleaning number storage section 571 and the cleaning-day number storage section 572 are preferably configured to be reset to an initial value (normally "0") by a predetermined trigger.

The cleaning number/operand storage section 573 stores the cleaning number and a feeling operand M1, which is a parameter used in an arithmetical operation carried out by a feeling calculation section 251 (later described), so that the cleaning number and the feeling operand M1 are associated with each other. In a case of a configuration in which the character type of the self-propelled cleaner 1 can be set, the feeling operand M1, which is associated with the cleaning number, can be stored for each character type. Note that data stored in the cleaning number/operand storage section 573 can be set in advance or set by the user.

The following description will discuss an example of the data stored in the cleaning number/operand storage section 573 with reference to (a) of FIG. 9. (a) of FIG. 9 schematically illustrates an example of data stored in the cleaning number/operand storage section 573. According to the example illustrated in (a) of FIG. 9, three levels of cleaning number, i.e., "less than 4", "4 or more and less than 7", and "7 or more" are set, and feeling operands M1 for each character type are set for the respective levels.

The cleaning-day number/operand storage section 574 stores the number of days on which cleaning has been carried out (hereinafter, referred to as "cleaning-day number") and a feeling operand M1 so that the cleaning-day number is associated with the feeling operand M1. In a case of a configuration in which the character type of the self-propelled cleaner 1 can be set, the feeling operand M1, which is associated with the cleaning-day number, can be stored for each character type. Note that data stored in the cleaning-day number/operand storage section 574 can be set in advance or set by the user.

The following description will discuss an example of data stored in the cleaning-day number/operand storage section 574, with reference to (b) of FIG. 9. (b) of FIG. 9 schematically illustrates an example of data stored in the cleaning-day number/operand storage section 574. According to the example illustrated in (*b*) of FIG. 9, three levels of cleaning-day number, i.e., "less than 4 days", "4 days or more and less than 7 days", and "7 days" are set, and feeling operands M1 for each character type are set for the respective levels.

The response operation information storage section 570 stores a feeling and response operation information, which indicates a response operation carried out by the self-propelled cleaner 1 when an event occurs, so that the feeling and the response operation information are associated with each other for each event. Note that data stored in the response operation information storage section 570 can be set in advance or set by the user.

The following description will discuss an example of data stored in the response operation information storage section 570, with reference to FIG. 10. FIG. 10 schematically illustrates an example of data stored in the response operation information storage section 570. According to the example illustrated in FIG. 10, an event indicating an instruction on starting cleaning, response operation information indicating a response operation carried out by the self-propelled cleaner 1 when the event occurs, and a feeling are stored so that the event, the response operation information, and the feeling are associated with each other.

In the response operation information storage section 570, (i) audio data is stored as response operation information indicating an audio output operation, (ii) the number of times of swiveling carried out by the self-propelled cleaner 1 is stored as response operation information indicating a device operation, (iii) a rotation speed of the side brushes 10 is stored as response operation information indicating a side brush operation, and (iv) a color and a pattern of lighting are stored as response operation information indicating a lighting operation.

The following description will discuss an example case based on the feeling "good mood". The feeling "good mood" is associated with four audio output operations with respective occurrence ratios (i.e., an occurrence ratio of an audio of a sentence 1 "I see" is 95%, an occurrence ratio of an audio of a sentence 2 "Yes" is 3%, an occurrence ratio of an audio of a sentence 3 "Yes, yes" is 1%, and an occurrence ratio of silence is 1%).

The feeling "good mood" is further associated with three device operations with respective occurrence ratios (i.e., an occurrence ratio of swiveling 3 times is 97%, an occurrence ratio of swiveling 2 times is 3%, and an occurrence ratio of no swiveling is 0%).

The feeling "good mood" is further associated with three side brush operations with respective occurrence ratios (i.e., an occurrence ratio of 3 rotations is 10%, an occurrence ratio of 2 rotations is 5%, and an occurrence ratio of no rotation is 85%).

The feeling "good mood" is further associated with one (1) lighting operation (i.e., lighting in a color specified by "BLINK1_GREEN" at 1-second intervals).

In a case where only one type of response operation information is employed, the occurrence ratio does not necessarily need to be set.

(Configuration of Control Section)

The control section 52 includes an event detecting section 101 (event detecting means), a feeling selecting section 201 (operation mode selecting means), a response operation control section 301 (operation control means), and a cleaning record information storage section 401 (cleaning number storing means, cleaning-day number storing means).

The event detecting section 101 detects occurrence of an event which relates to the self-propelled cleaner 1. The following (E1) through (E3) indicate typical examples of event detected by the event detecting section 101.

(E1) An audio indicative of an operation instruction to the self-propelled cleaner 1 has been inputted via the audio input section 63 (that is, the user has given an operation instruction to the self-propelled cleaner 1 by audio) (hereinafter, referred to as "audio input event"). (E2) A control signal has been received, via the communication control section 53, which is indicative of an operation instruction to the self-propelled cleaner 1 and has been transmitted from an external device such as a mobile terminal owned by the user or a remote controller. (That is, the user has given an operation instruction to the self-propelled cleaner 1 with the use of the mobile terminal, the remote controller, or the like) (hereinafter, referred to as "command receiving event"). (E3) An operation instruction to the self-propelled cleaner 1 has been directly inputted via the operation panel 50 (hereinafter, referred to as "instruction input event").

Typical examples of the operation instruction encompass an instruction on starting cleaning, an instruction on terminating cleaning, an instruction on temporarily stopping cleaning, an instruction on changing a traveling direction, an instruction on swiveling of the self-propelled cleaner 1, and an instruction on returning to the battery charging dock 40.

In order to detect the audio input event, the command receiving event, and the instruction input event, the event detecting section 101 includes an audio judging section 111, a command judging section 121, and an operation judging section 131.

The audio judging section 111 collates an audio, which has been inputted via the audio input section 63, with an audio which is registered in the storage section 57 in advance and relates to the operation instruction, and if the audios are identical to each other, the audio judging section 111 detects that an audio input event has occurred. Note that the audio which relates to the operation instruction can be registered by the user.

The command judging section 121 judges whether or not a control signal, which has been received via the communication control section 53, indicates an operation instruction. In a case where a control signal indicative of an operation instruction has been received, the command judging section 121 detects that a command receiving event has occurred.

The operation judging section 131 judges whether or not an operation instruction has been accepted by the operation panel 50. In a case where an operation instruction has been accepted, the operation judging section 131 detects that an instruction input event has occurred.

The following description will discuss the feeling selecting section 201. When the event detecting section 101 has detected occurrence of an event, the feeling selecting section 201 selects one of "good mood", "normal", and "bad mood" as a feeling for carrying out a response operation with respect to the event, in accordance with the frequency of cleaning carried out by the self-propelled cleaner 1.

The frequency of cleaning is at least any of the number of cleanings (hereinafter, referred to as "most-recent cleaning number") carried out during a most recent predetermined period (hereinafter, referred to as "period T") and the number of days (hereinafter, referred to as "most-recent cleaning-day number") on which cleaning has been carried out during the period T. Note that the frequency of cleaning is information relating to cleaning which can be measured by the self-propelled cleaner 1 and is one of indications of usage state of the self-propelled cleaner 1.

Typical examples of the period T encompass (1) most recent several days, (2) a period of time from when a main power source of the self-propelled cleaner 1 was last turned on to the current time, and (3) a period of time from when the self-propelled cleaner 1 was shipped to the current time.

The feeling selecting section 201 includes an operand determining section 231 and a feeling calculation section 251. When the event detecting section 101 has detected occurrence of an event, the operand determining section 231 determines a feeling operand M1, which is a parameter used in an arithmetical operation carried out by the feeling calculation section 251, in accordance with a frequency of cleaning carried out by the self-propelled cleaner 1.

First, the following description will discuss a case where the most-recent cleaning number is use as the frequency of cleaning. In this case, the operand determining section 231 first obtains the cleaning number for each day during the period T, which cleaning number is stored in the cleaning number storage section 571. Then, the operand determining section 231 obtains a feeling operand M1 which is stored in the cleaning number/operand storage section 573 while being associated with a total of the obtained cleaning numbers.

The following description will discuss a concrete example in which the period T is most recent 7 days. In a case where (i) the data illustrated in (a) of FIG. 9 is stored in the cleaning number/operand storage section 573, (ii) a total of the cleaning numbers during the most recent 7 days is less than 4, and (iii) the character of the self-propelled cleaner 1 is the feeling type, the operand determining section 231 obtains "−10" as the feeling operand M1. Similarly, in a case where the total of the cleaning numbers is less than 4 and the character of the self-propelled cleaner 1 is the calm type, the operand determining section 231 obtains "−7" as the feeling operand M1. Similarly, in a case where the total of the cleaning numbers is less than 4 and the character of the self-propelled cleaner 1 is the tolerant type, the operand determining section 231 obtains "−5" as the feeling operand M1.

Next, the following description will discuss a case where the most-recent cleaning-day number is used as the frequency of cleaning. In this case, the operand determining section 231 first obtains the number of days on which cleaning has been carried out during the period T, which number of days is stored in the cleaning-day number storage section 572. Then, the operand determining section 231 obtains a feeling operand M1 which is stored in the cleaning-day number/operand storage section 574 while being associated with the obtained number of days.

The following description will discuss a concrete example in which the period T is most recent 7 days. In a case where (i) the data illustrated in (b) of FIG. 9 is stored in the cleaning-day number/operand storage section 574, (ii) the total of cleaning days during the most recent 7 days is less than 4, and (iii) the character of the self-propelled cleaner 1 is the feeling type, the operand determining section 231 obtains "−20" as the feeling operand M1. Similarly, the total of cleaning days is less than 4 and the character of the self-propelled cleaner 1 is the calm type, the operand determining section 231 obtains "−14" as the feeling operand M1. Similarly, in a case where the total of cleaning days is less than 4 and the character of the self-propelled cleaner 1 is the tolerant type, the operand determining section 231 obtains "−10" as the feeling operand M1.

Note that which of the most-recent cleaning number and the most-recent cleaning-day number is used as the frequency of cleaning can be randomly selected or can be selected in accordance with a predetermined priority.

Next, the feeling calculation section 251 calculates a feeling value M for specifying a feeling based on a predetermined arithmetic expression with the use of the feeling operand M1 determined by the operand determining section 231. Typical examples of the arithmetic expression encompass (Expression 1) through (Expression 3) below. Note, however, that the arithmetic expression is not limited to those and various arithmetic expressions can be employed.

$$M = M1 \quad \text{(Expression 1)}$$

$$M = m \times M0 + M1 \quad \text{(Expression 2)}$$

$$M = m \times M0 + M1 + M2 \quad \text{(Expression 3)}$$

where "M0" represents a feeling value M previously calculated.

Moreover, "m" represents a coefficient (0 or more and 1 or less) which varies in accordance with an elapsed time from when the previous feeling value M was calculated. The coefficient m becomes smaller as the elapsed time from when the previous feeling value M was calculated is increased.

The following description will discuss an example of the coefficient m, with reference to FIG. 11. FIG. 11 is a view schematically illustrating an example of the coefficient m. According to the example, the coefficient m is set for each of the character types of the self-propelled cleaner 1. As illustrated in FIG. 11, the coefficient m is set to become smaller as the time elapses from when the previous feeling value M was calculated. For example, in a case where the character is the feeling type and the elapsed time is less than 1 hour, the coefficient m is 1. Alternatively, in a case where the character is the feeling type and the elapsed time is 18 hours or more, the coefficient m is 0.6.

"M2" represents a point value obtained as a result of, for example, a predetermined game which the user played with the mobile terminal. The point value is assumed to be received via the communication control section 53.

In (Expression 1) above, the feeling operand M1 is used as it is as a current feeling value M. In (Expression 2) above, a previous feeling value M can be reflected to a current feeling value M in accordance with time elapsed from when a previous arithmetical operation was carried out. When (Expression 3) above is used, a feeling value M can be obtained by adding points obtained as a result of a predetermined game which the user played with the mobile terminal or the like.

Then, the feeling calculation section 251 selects a feeling of the self-propelled cleaner 1 in accordance with the feeling value M obtained as the arithmetical operation result. For example, in a case where the feeling values M and the feelings are associated with each other as illustrated in FIG. 12, the feeling calculation section 251 selects (i) the "good mood" if the feeling value M is 25 or more, (ii) the "normal" if the feeling value M is −25 or more and less than 25, and (iii) the "bad mood" if the feeling value M is less than −25.

The following description will discuss the response operation control section 301. Based on an event detected by the event detecting section 101 and a feeling selected by the feeling selecting section 201, the response operation control section 301 controls the self-propelled cleaner 1 to carry out a response operation with respect to the event. More specifically, the response operation control section 301 controls the self-propelled cleaner 1 to carry out a response operation in accordance with response operation information which is stored in the response operation information storage section 570 while being associated with the event detected by the event detecting section 101 and with the feeling selected by the feeling selecting section 201.

As such, in a case where (i) the event detecting section 101 has detected any of the audio input event, the command receiving event, and the instruction input event each of which indicates the instruction on starting cleaning, (ii) the feeling selecting section 201 has selected the "good mood", and the data illustrated in FIG. 10 is stored in the response operation information storage section 570, the response operation control section 301 executes any of the following controls (r1) through (r4) or a combination thereof.

(r1) As the audio output operation, the response operation control section 301 controls the audio output section 64 to (i) output an audio of the sentence 1 at a 95% probability, (ii) output an audio of the sentence 2 at a 3% probability, (iii) output an audio of the sentence 3 at a 1% probability, or (iv) output no audio at a 1% probability.

(r2) As the device operation, the response operation control section 301 controls the driving wheels 29 via the traveling driver section 58 such that (i) the self-propelled cleaner 1 swivels on the center line C 3 times at a 97% probability or (ii) the self-propelled cleaner 1 swivels on the center line C 2 times at a 3% probability.

(r3) As the side brush operation, the response operation control section 301 controls the side brush driving section 60 such that (i) the side brushes 10 rotate once at a 10% probability, (ii) the side brushes 10 rotate twice at a 5% probability, or (iii) the side brushes 10 do not rotate at a 85% probability.

(r4) As the lighting operation, the response operation control section 301 controls the LED lamp lighting section 54 such that the LED lamp 51 lights up in a color specified by "BLINK1_GREEN" at 1-second intervals.

The following description will discuss the cleaning record information storage section 401. When the self-propelled cleaner 1 starts cleaning, the cleaning record information storage section 401 updates the cleaning number stored in the cleaning number storage section 571 and records information, which indicates that the cleaning has been carried out, on the cleaning-day number storage section 572. Note that the cleaning record information storage section 401 can store data for each cleaning mode or without distinguishing the cleaning modes, depending on data structures in the cleaning number storage section 571 and the cleaning-day number storage section 572.

(Process Flow)

Figure 13:
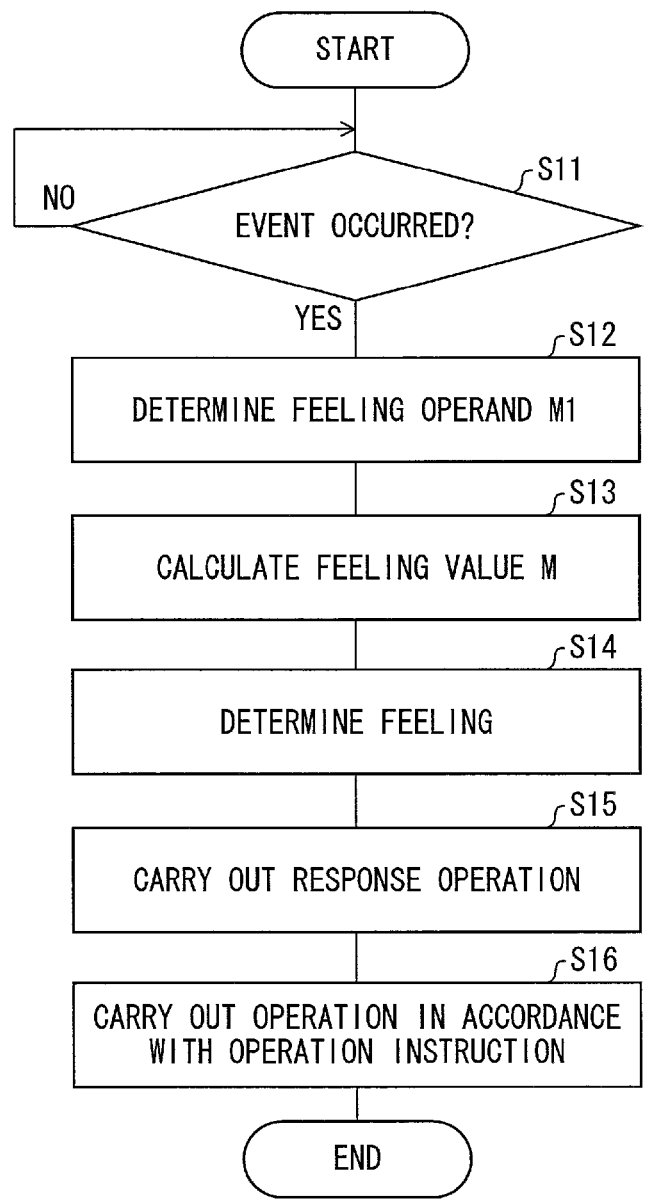
FIG. 13 is a flowchart illustrating a flow of processes carried out in the self-propelled cleaner.

The following description will discuss a flow of processes carried out in the self-propelled cleaner 1, with reference to FIG. 13. FIG. 13 is a flowchart illustrating a flow of processes carried out in the self-propelled cleaner 1.

First, when the event detecting section 101 has detected occurrence of an event (YES in step (hereinafter, simply referred to as "S") 11), the operand determining section 231 determines a feeling operand M1 (S12).

Then, the feeling calculation section 251 calculates a feeling value M (S13) with the use of the feeling operand M1 determined in the step S12, and selects a feeling in accordance with the feeling value M (S14).

Then, the response operation control section 301 controls the self-propelled cleaner 1 to carry out a response operation which is associated with the event detected in the step S11 and with the feeling selected in the step S14 (S15).

Note that, in a case where the event detected in the step S11 is an operation instruction to the self-propelled cleaner 1, the self-propelled cleaner 1 carries out an operation (such as cleaning) in accordance with the operation instruction (S16), after the response operation carried out in the step S15.

Embodiment 2

Figure 14:
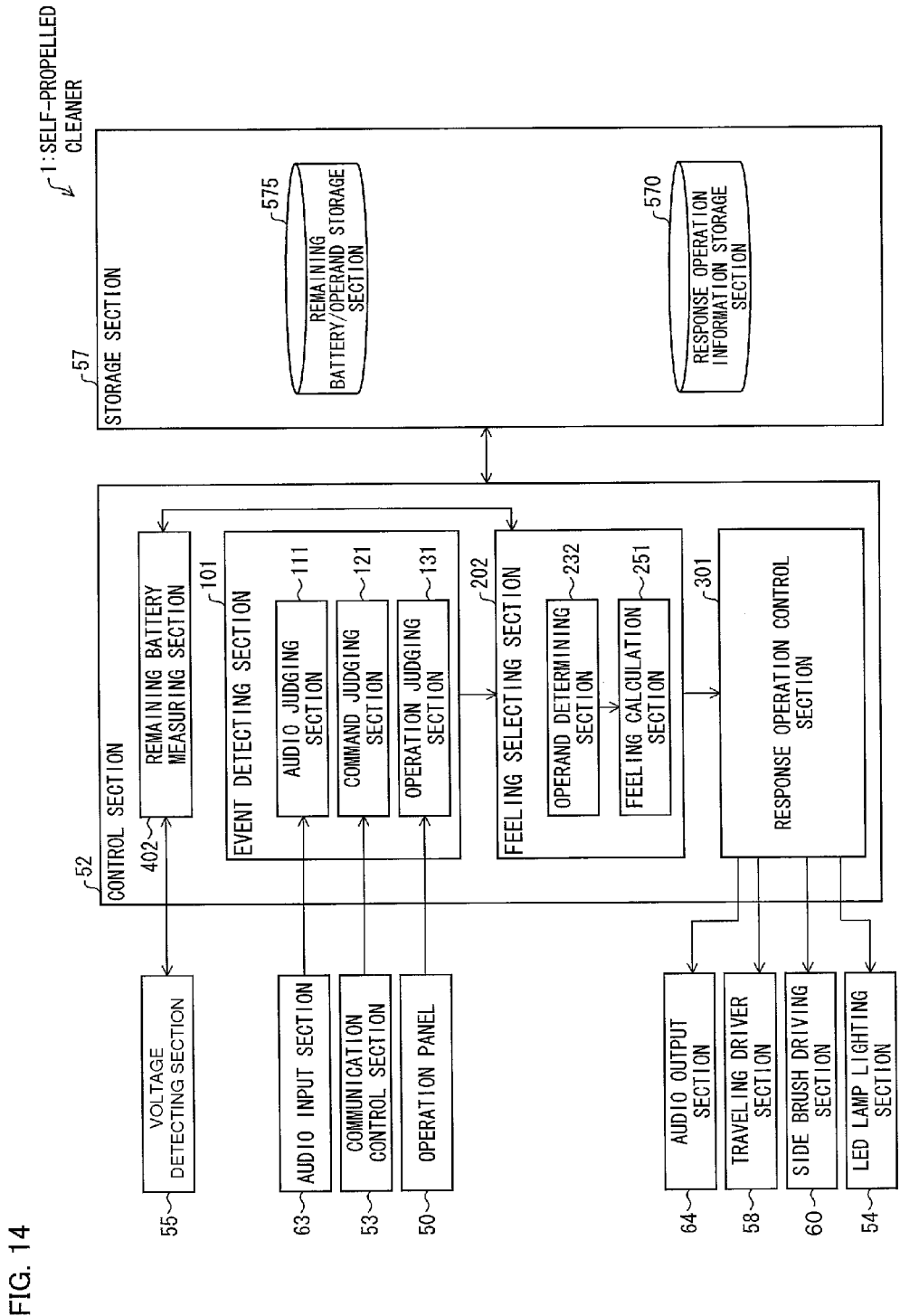
FIG. 14 is a block diagram illustrating a configuration of a storage section and a control section of a self-propelled cleaner in accordance with another embodiment of the present invention.
Figure 15:
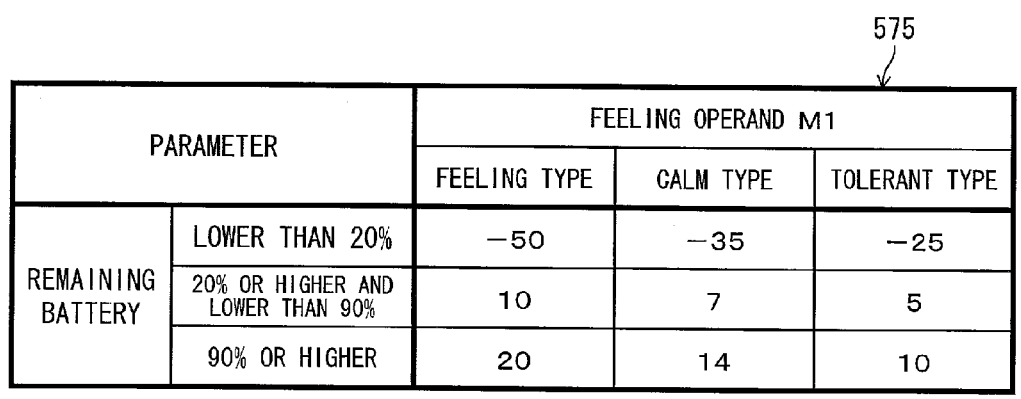
FIG. 15 is a view schematically illustrating an example of data stored in a remaining battery/operand storage section included in the storage section.

The following description will discuss another embodiment of the present invention, with reference to FIG. 14 and FIG. 15. For convenience of explanation, the same reference numerals are given to members having functions identical to those described in Embodiment 1, and descriptions of such members are omitted unless otherwise noted.

The following description will discuss configurations of a storage section 57 and a control section 52 of a self-propelled cleaner 1 in accordance with the present embodiment, with reference to FIG. 14. FIG. 14 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes a remaining battery/operand storage section 575 and a response operation information storage section 570.

The remaining battery/operand storage section 575 stores a remaining battery level of the battery 14 and a feeling operand M1 so that the remaining battery level and the feeling operand M1 are associated with each other. In a case of a configuration in which a character type of the self-propelled cleaner 1 can be set, the feeling operand M1, which is associated with the remaining battery level, can be stored for each character type. Note that data stored in the remaining battery/operand storage section 575 can be set in advance or set by the user.

The following description will discuss an example of data stored in the remaining battery/operand storage section 575, with reference to FIG. 15. FIG. 15 is a view schematically illustrating an example of data stored in the remaining battery/operand storage section 575. According to the example illustrated in FIG. 15, three levels of remaining battery, i.e., "lower than 20%", "20% or higher and lower than 90%", and "90% or higher" are set, and feeling operands M1 for each character type are set for the respective levels.

(Configuration of Control Section)

The control section 52 of the present embodiment includes an event detecting section 101, a feeling selecting section 202 (operation mode selecting means), a response operation control section 301, and a remaining battery measuring section 402 (remaining battery measuring means).

The remaining battery measuring section 402 measures a remaining battery level of the battery 14 via a voltage detecting section 55 in response to a request for measuring the remaining battery level of the battery 14. Note that the remaining battery level of the battery 14 is obtained based on a difference between a battery level of the fully charged battery 14 and a measured battery level of the battery 14.

Next, when the event detecting section 101 has detected occurrence of an event, the feeling selecting section 202 selects, in accordance with the remaining battery level of the battery 14, one of "good mood", "normal", and "bad mood" as a feeling with which the self-propelled cleaner 1 carries out a response operation with respect to the event. Note that the remaining battery level of the battery 14 is information relating to cleaning which can be measured by the self-propelled cleaner 1 and is one of indications of usage state of the self-propelled cleaner 1.

The feeling selecting section 202 includes an operand determining section 232 and a feeling calculation section 251. The operand determining section 232 requests the remaining battery measuring section 402 to measure a remaining battery level of the battery 14, and then obtains the remaining battery measured by the remaining battery measuring section 402. Then, the operand determining section 232 obtains a feeling operand M1 which is stored in the remaining battery/operand storage section 575 while being associated with the obtained remaining battery level.

The following description will discuss a concrete example in which the data illustrated in FIG. 15 is stored in the remaining battery/operand storage section 575. In a case where the remaining battery level is lower than 20% and the character of the self-propelled cleaner 1 is the feeling type, the operand determining section 232 obtains "−50" as the feeling operand M1. Similarly, in a case where the remaining battery level is lower than 20% and the character of the self-propelled cleaner 1 is the calm type, the operand determining section 232 obtains "−35" as the feeling operand M1. Similarly, in a case where the remaining battery level is lower than 20% and the character of the self-propelled cleaner 1 is the tolerant type, the operand determining section 232 obtains "−25" as the feeling operand M1.

(Process Flow)

A flow of processes carried out in the present embodiment is substantially identical with the flow of processes carried out in the self-propelled cleaner 1 of Embodiment 1, except that the operand determining section 232 determines the feeling operand M1 instead of the operand determining section 231. Therefore, the flow of processes carried out in the present embodiment is not repeatedly described here.

Embodiment 3

Figure 16:
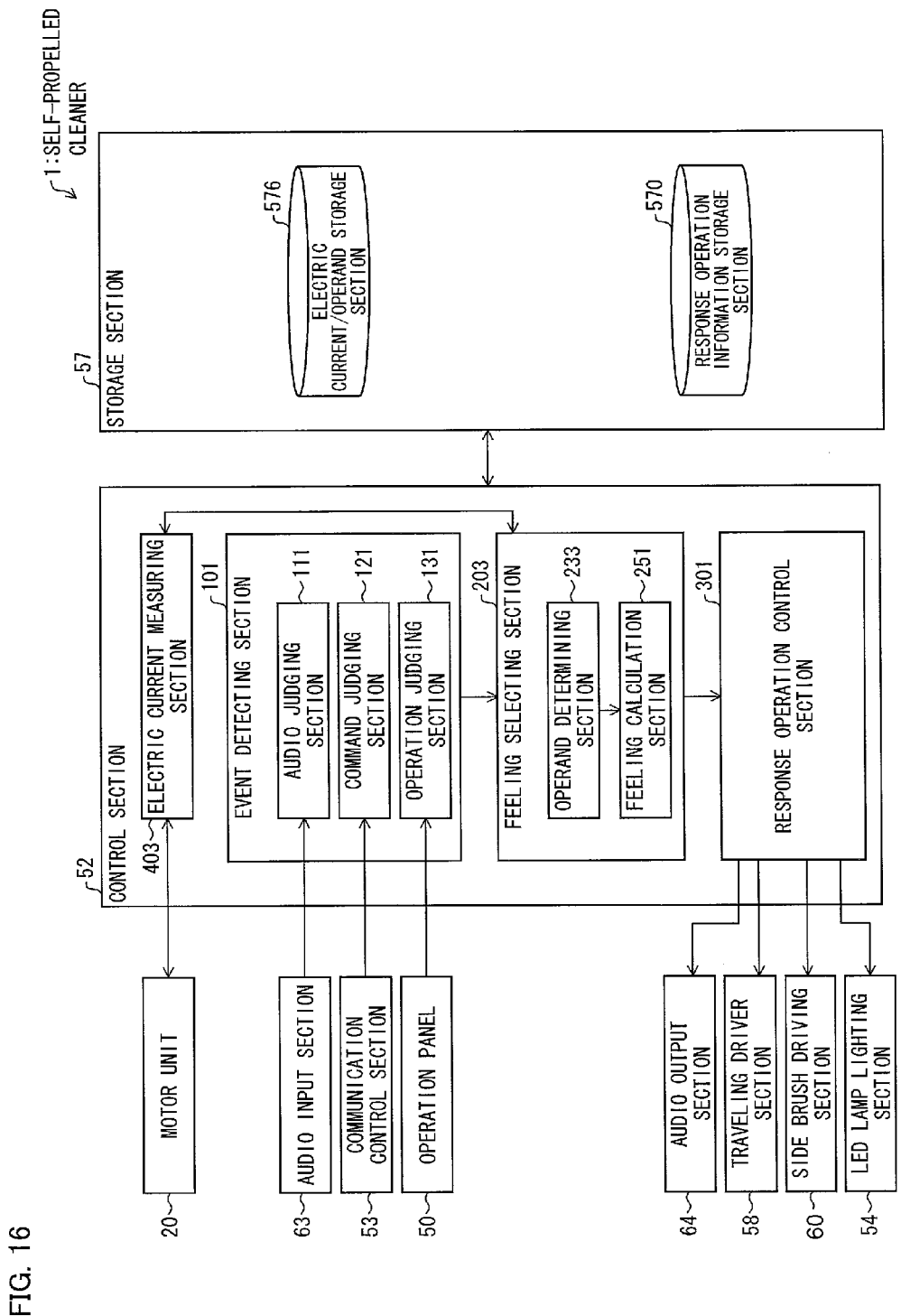
FIG. 16 is a block diagram illustrating a configuration of a storage section and a control section of a self-propelled cleaner in accordance with yet another embodiment of the present invention.

The following description will discuss yet another embodiment of the present invention, with reference to FIG. 16 and FIG. 17. For convenience of explanation, the same reference numerals are given to members having functions identical to those described in the above embodiments, and descriptions of such members are omitted unless otherwise noted.

The following description will discuss configurations of a storage section 57 and a control section 52 of a self-propelled cleaner 1 in accordance with the present embodiment, with reference to FIG. 16. FIG. 16 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes an electric current/operand storage section 576 and a response operation information storage section 570.

The electric current/operand storage section 576 stores an electric current of a motor unit 20 and a feeling operand M1 so that the electric current and the feeling operand M1 are associated with each other. In a case of a configuration in which a character type of the self-propelled cleaner 1 can be set, the feeling operand M1, which is associated with the electric current, can be stored for each character type. Note that data stored in the electric current/operand storage section 576 can be set in advance or set by the user.

The following description will discuss an example of data stored in the electric current/operand storage section 576, with reference to FIG. 17. FIG. 17 is a view schematically illustrating an example of data stored in the electric current/operand storage section 576. According to the example illustrated in FIG. 17, three levels of electric current, i.e., "lower than 1.4 A", "1.4 A or higher and lower than 1.6 A", and "1.6 A or higher" are set, and feeling operands M1 for each character type are set for the respective levels.

(Configuration of Control Section)

The control section 52 of the present embodiment includes an event detecting section 101, a feeling selecting section 203 (operation mode selecting means), a response operation control section 301, and an electric current measuring section 403 (electric current measuring means).

The electric current measuring section 403 measures an electric current of the motor unit 20 in response to a request for measuring the electric current of the motor unit 20.

Next, when the event detecting section 101 has detected occurrence of an event, the feeling selecting section 203 selects, in accordance with an amount of dust contained in the dust collection section 30, one of "good mood", "normal", and "bad mood" as a feeling with which the self-propelled cleaner 1 carries out a response operation with respect to the event. Note that the amount of dust contained in the dust collection section 30 is information relating to cleaning which can be measured by the self-propelled cleaner 1 and is one of indications of usage state of the self-propelled cleaner 1.

The feeling selecting section 203 includes an operand determining section 233 and a feeling calculation section 251.

An approximate amount of the dust contained in the dust collection section 30 can be grasped based on the electric current of the motor unit 20 which is being driven. Under the circumstances, the operand determining section 233 first requests the electric current measuring section 403 to measure the electric current of the motor unit 20 and obtains the electric current measured by the electric current measuring section 403. Then, the operand determining section 233 obtains a feeling operand M1 which is stored in the electric current/operand storage section 576 while being associated with the obtained electric current.

The following description will discuss a concrete example in which the data illustrated in FIG. 17 is stored in the electric current/operand storage section 576. In a case where the electric current is lower than 1.4 A and the character of the self-propelled cleaner 1 is the feeling type, the operand determining section 233 obtains "−20" as the feeling operand M1. Similarly, in a case where the electric current is lower than 1.4 A and the character of the self-propelled cleaner 1 is the calm type, the operand determining section 233 obtains "−14" as the feeling operand M1. Similarly, in a case where the electric current is lower than 1.4 A and the character of the self-propelled cleaner 1 is the tolerant type, the operand determining section 233 obtains "−10" as the feeling operand M1.

(Process Flow)

A flow of processes carried out in the present embodiment is substantially identical with the flow of processes carried out in the self-propelled cleaner 1 of Embodiment 1, except that the operand determining section 233 determines the feeling operand M1 instead of the operand determining section 231. Therefore, the flow of processes carried out in the present embodiment is not repeatedly described here.

Embodiment 4

Figure 18:
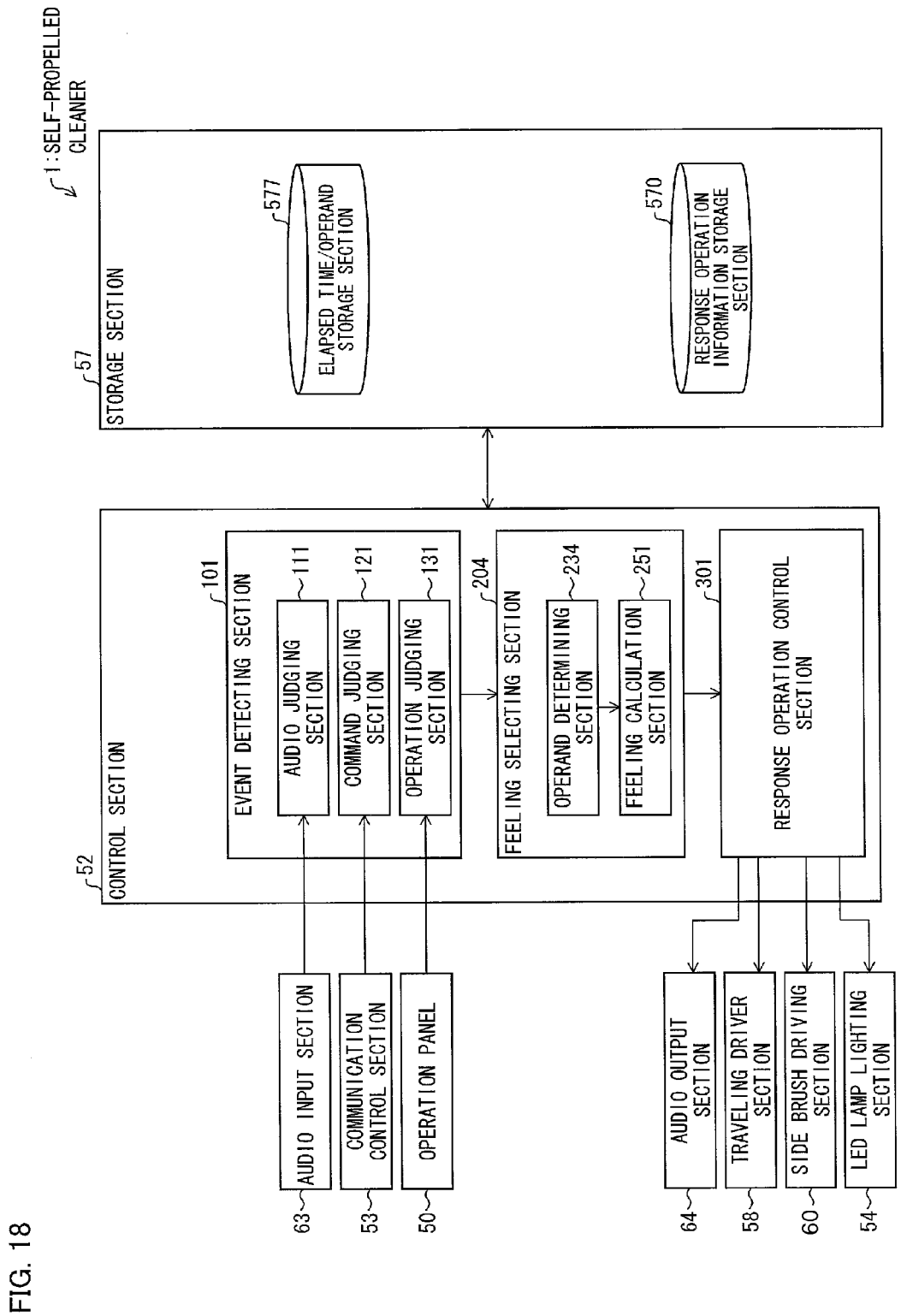
FIG. 18 is a block diagram illustrating a configuration of a storage section and a control section of a self-propelled cleaner in accordance with yet another embodiment of the present invention.

The following description will discuss yet another embodiment of the present invention, with reference to FIG. 18 and FIG. 19. For convenience of explanation, the same reference numerals are given to members having functions identical to those described in the above embodiments, and descriptions of such members are omitted unless otherwise noted.

The following description will discuss configurations of a storage section 57 and a control section 52 of a self-propelled cleaner 1 in accordance with the present embodiment, with reference to FIG. 18. FIG. 18 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes an elapsed time/operand storage section 577 and a response operation information storage section 570.

The elapsed time/operand storage section 577 stores time information indicative of time and a feeling operand M1 so that the time information and the feeling operand M1 are associated with each other. In a case of a configuration in which a character type of the self-propelled cleaner 1 can be set, the feeling operand M1, which is associated with the time information, can be stored for each character type. Note that data stored in the elapsed time/operand storage section 577 can be set in advance or set by the user.

The following description will discuss an example of data stored in the elapsed time/operand storage section 577, with reference to FIG. 19. FIG. 19 is a view schematically illustrating an example of data stored in the elapsed time/operand storage section 577. According to the example illustrated in FIG. 19, three levels of time information, i.e., "less than 2 days", "2 days or more and less than 5 days", and "5 days or more" are set, and feeling operands M1 for each character type are set for the respective levels.

(Configuration of Control Section)

The control section 52 of the present embodiment includes an event detecting section 101, a feeling selecting section 204 (operation mode selecting means), and a response operation control section 301.

Next, when the event detecting section 101 has detected occurrence of an event, the feeling selecting section 204 selects one of "good mood", "normal", and "bad mood", as a feeling with which the self-propelled cleaner 1 carries out a response operation, for each predetermined time period from when the event occurred and in accordance with an elapsed time from when the event occurred. Note that the elapsed time from when the event occurred is information relating to cleaning which can be measured by the self-propelled cleaner 1 and is one of indications of usage state of the self-propelled cleaner 1.

The feeling selecting section 204 includes an operand determining section 234 and a feeling calculation section 251. The operand determining section 234 measures a time elapsed from when the event detecting section 101 detected the event. At every predetermined time, the operand determining section 234 obtains a feeling operand M1 which is stored in the elapsed time/operand storage section 577 while being associated with the measured elapsed time.

The following description will discuss a concrete example in which the data illustrated in FIG. 19 is stored in the elapsed time/operand storage section 577. As illustrated in FIG. 19, in a case where the elapsed time is 5 days or more and the character of the self-propelled cleaner 1 is the feeling type, the operand determining section 234 obtains "−10" as the feeling operand M1. Similarly, in a case where the elapsed time is 5 days or more and the character of the self-propelled cleaner 1 is the calm type, the operand determining section 234 obtains "−7" as the feeling operand M1. Similarly, in a case where the elapsed time is 5 days or more and the character of the self-propelled cleaner 1 is the tolerant type, the operand determining section 234 obtains "−5" as the feeling operand M1.

(Process Flow)

A flow of processes carried out in the present embodiment is substantially identical with the flow of processes carried out in the self-propelled cleaner 1 of Embodiment 1, except that the operand determining section 234 determines the feeling operand M1 instead of the operand determining section 231. Therefore, the flow of processes carried out in the present embodiment is not repeatedly described here.

Embodiment 5

Figure 20:
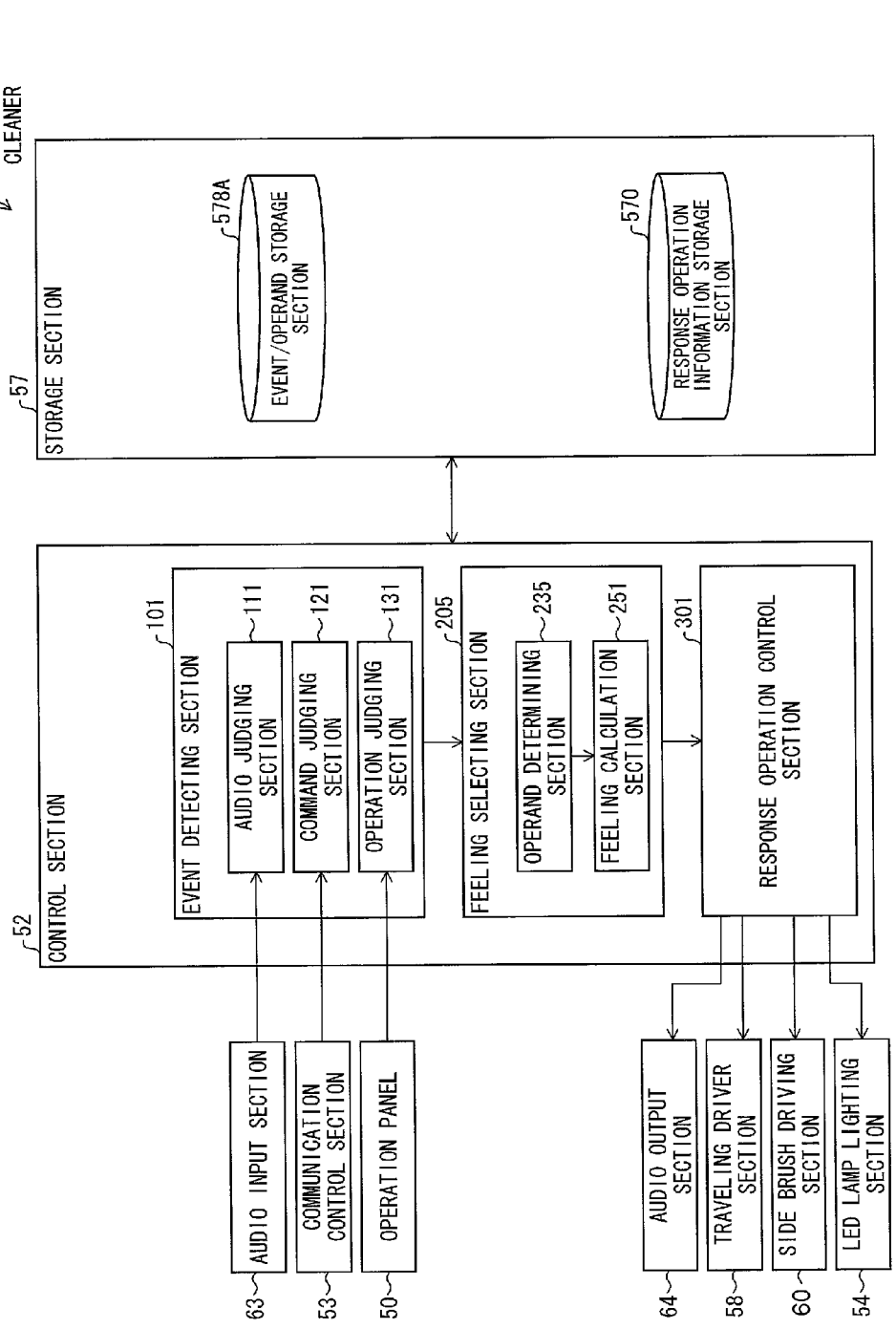
FIG. 20 is a block diagram illustrating a configuration of a storage section and a control section of a self-propelled cleaner in accordance with yet another embodiment of the present invention.

The following description will discuss yet another embodiment of the present invention, with reference to FIG. 20 and FIG. 21. For convenience of explanation, the same reference numerals are given to members having functions identical to those described in the above embodiments, and descriptions of such members are omitted unless otherwise noted.

The following description will discuss configurations of a storage section 57 and a control section 52 of a self-propelled cleaner 1 in accordance with the present embodiment, with reference to FIG. 20. FIG. 20 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes an event/operand storage section 578A and a response operation information storage section 570.

The event/operand storage section 578A stores an event and a feeling operand M1 so that the event and the feeling operand M1 are associated with each other. In a case of a configuration in which a character type of the self-propelled cleaner 1 can be set, the feeling operand M1, which is associated with the event, can be stored for each character type. Note that data stored in the event/operand storage section 578A can be set in advance or set by the user.

The following description will discuss an example of data stored in the event/operand storage section 578A, with reference to FIG. 21. FIG. 21 is a view schematically illustrating an example of data stored in the event/operand storage section 578A. According to the example illustrated in FIG. 21, feeling operands M1 for each character type are associated with an audio input event, a command receiving event, and an instruction input event.

(Configuration of Control Section)

The control section 52 of the present embodiment includes an event detecting section 101, a feeling selecting section 205 (operation mode selecting means), and a response operation control section 301.

When the event detecting section 101 has detected occurrence of an event, the feeling selecting section 205 selects, in accordance with the event, one of "good mood", "normal", and "bad mood" as a feeling with which the self-propelled cleaner 1 carries out a response operation with respect to the event.

The feeling selecting section 205 includes an operand determining section 235 and a feeling calculation section 251. When the event detecting section 101 has detected occurrence of an event, the operand determining section 235 obtains, from the event/operand storage section 578A, a feeling operand M1 which is used to carry out a response operation with respect to the event.

The following description will discuss a concrete example in which the data illustrated in FIG. 21 is stored in the event/operand storage section 578A. In a case where the character of the self-propelled cleaner 1 is the feeling type, the operand determining section 235 obtains "7" as the feeling operand M1. Similarly, in a case where the character of the self-propelled cleaner 1 is the calm type, the operand determining section 235 obtains "6" as the feeling operand M1. Similarly, in a case where the character of the self-propelled cleaner 1 is the tolerant type, the operand determining section 235 obtains "5" as the feeling operand M1.

(Process Flow)

A flow of processes carried out in the present embodiment is substantially identical with the flow of processes carried out in the self-propelled cleaner 1 of Embodiment 1, except that the operand determining section 235 determines the feeling operand M1 instead of the operand determining section 231. Therefore, the flow of processes carried out in the present embodiment is not repeatedly described here.

Embodiment 6

Figure 22:
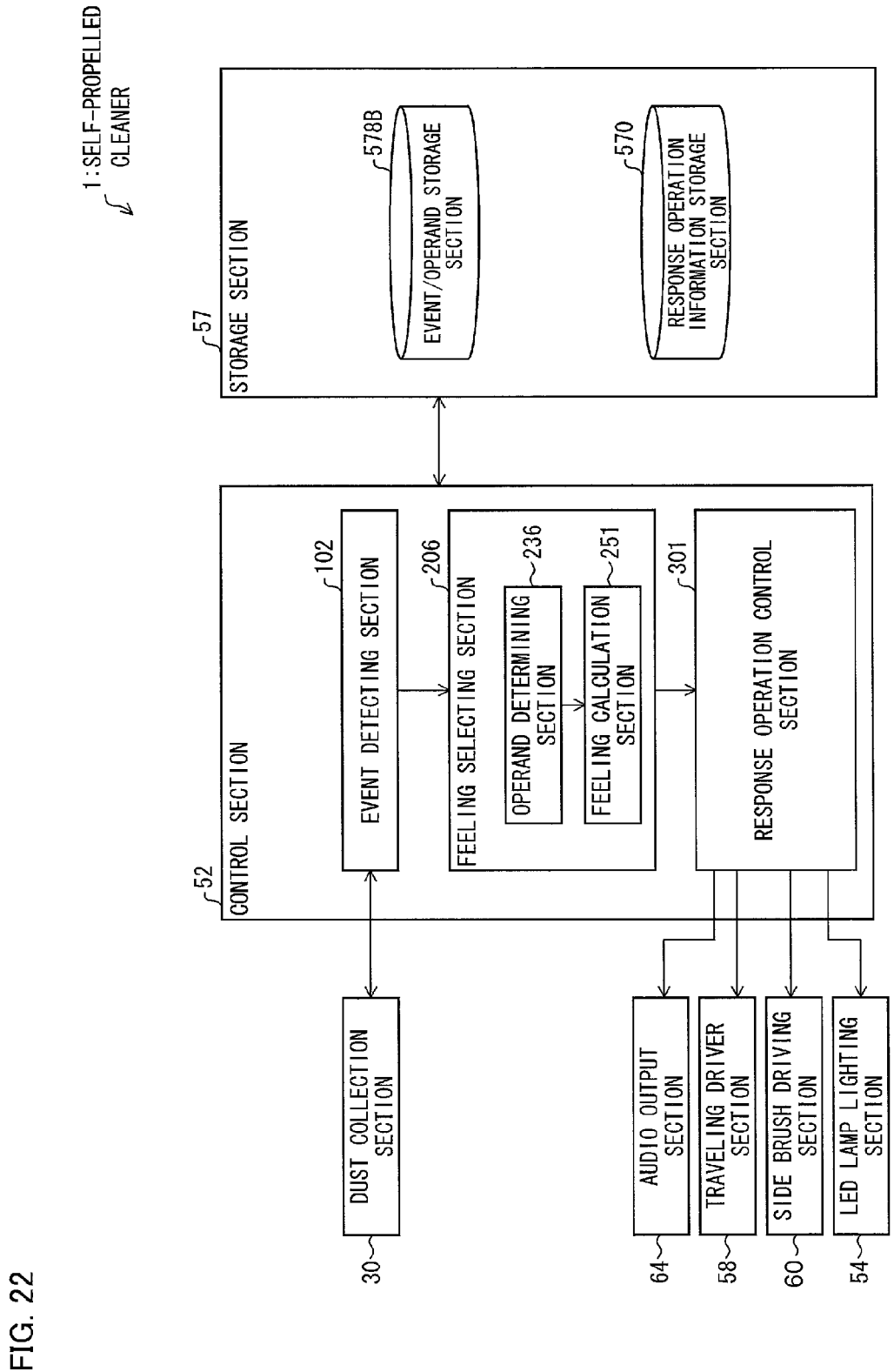
FIG. 22 is a block diagram illustrating a configuration of a storage section and a control section of a self-propelled cleaner in accordance with yet another embodiment of the present invention.

The following description will discuss yet another embodiment of the present invention, with reference to FIG. 22 and FIG. 23. For convenience of explanation, the same reference numerals are given to members having functions identical to those described in Embodiments 1 through 5, and descriptions of such members are omitted unless otherwise noted.

The following description will discuss configurations of a storage section 57 and a control section 52 of a self-propelled cleaner 1 in accordance with the present embodiment, with reference to FIG. 22. FIG. 22 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes an event/operand storage section 578B and a response operation information storage section 570.

The event/operand storage section 578B stores an event and a feeling operand M1 so that the event and the feeling operand M1 are associated with each other. In a case of a configuration in which a character type of the self-propelled cleaner 1 can be set, the feeling operand M1, which is associated with the event, can be stored for each character type. Note that data stored in the event/operand storage section 578B can be set in advance or set by the user.

The following description will discuss an example of data stored in the event/operand storage section 578B, with reference to FIG. 23. FIG. 23 is a view schematically illustrating an example of data stored in the event/operand storage section 578B. According to the example illustrated in FIG. 23, feeling operands M1 for the respective character types are associated with an event in which "the dust collection section 30 has been detached" (hereinafter, referred to as "detachment event").

(Configuration of Control Section)

The control section 52 of the present embodiment includes an event detecting section 102 (event detecting means), a feeling selecting section 206 (operation mode selecting means), and a response operation control section 301.

The event detecting section 102 detects occurrence of a detachment event by judging whether or not the dust collection section 30 is being attached or detached. When the dust collection section 30 has been detached, the event detecting section 102 detects the detachment event. Note that the detachment event is one of events relating to cleaning.

The following description will discuss the feeling selecting section 206. The feeling selecting section 206 includes an operand determining section 236 and a feeling calculation section 251. When the event detecting section 102 has detected occurrence of an event, the operand determining section 236 obtains, from the event/operand storage section 578B, a feeling operand M1 which is used to carry out a response operation with respect to the event.

The following description will discuss a concrete example in which the data illustrated in FIG. 23 is stored in the event/operand storage section 578B. In a case where the character of the self-propelled cleaner 1 is the feeling type, the operand determining section 236 obtains "10" as the feeling operand M1. Similarly, in a case where the character of the self-propelled cleaner 1 is the calm type, the operand determining section 236 obtains "7" as the feeling operand M1. Similarly, in a case where the character of the self-propelled cleaner 1 is the tolerant type, the operand determining section 236 obtains "5" as the feeling operand M1.

(Process Flow)

A flow of processes carried out in the present embodiment is substantially identical with the flow of processes carried out in the self-propelled cleaner 1 of Embodiment 1, except that (i) the event detecting section 102 detects an event instead of the event detecting section 101 and (ii) the operand determining section 236 determines a feeling operand M1 instead of the operand determining section 231. Therefore, the flow of processes carried out in the present embodiment is not repeatedly described here.

Embodiment 7

Figure 24:
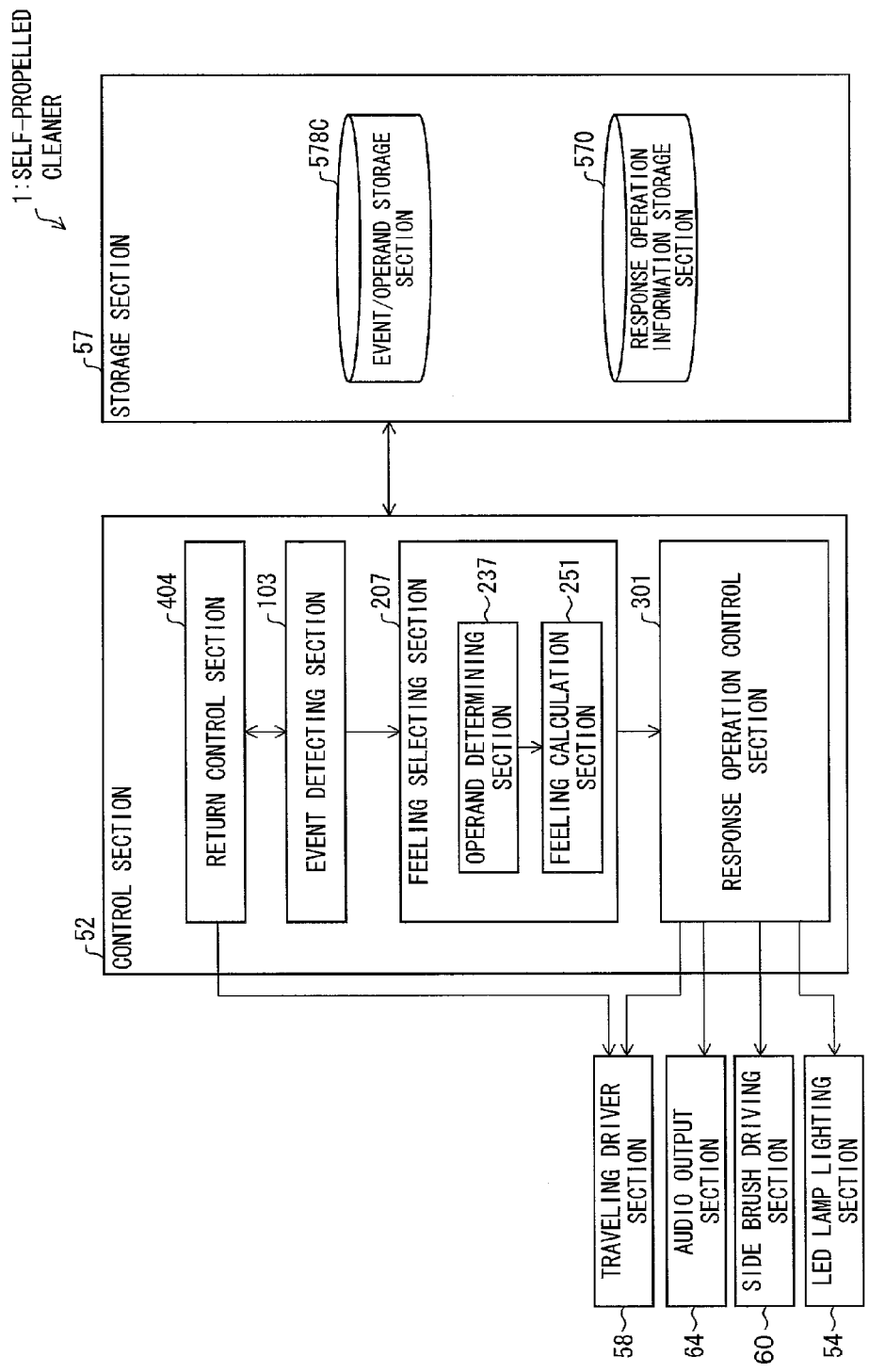
FIG. 24 is a block diagram illustrating a configuration of a storage section and a control section of a self-propelled cleaner in accordance with yet another embodiment of the present invention.

The following description will discuss yet another embodiment of the present invention, with reference to FIG. 24 and FIG. 25. For convenience of explanation, the same reference numerals are given to members having functions identical to those described in Embodiments 1 through 6, and descriptions of such members are omitted unless otherwise noted.

The following description will discuss configurations of a storage section 57 and a control section 52 of a self-propelled cleaner 1 in accordance with the present embodiment, with reference to FIG. 24. FIG. 24 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes an event/operand storage section 578C and a response operation information storage section 570.

The event/operand storage section 578C stores an event and a feeling operand M1 so that the event and the feeling operand M1 are associated with each other. In a case of a configuration in which a character type of the self-propelled cleaner 1 can be set, the feeling operand M1, which is associated with the event, can be stored for each character type. Note that data stored in the event/operand storage section 578C can be set in advance or set by the user.

The following description will discuss an example of data stored in the event/operand storage section 578C, with reference to FIG. 25. FIG. 25 is a view schematically illustrating an example of data stored in the event/operand storage section 578C. According to the example illustrated in FIG. 25, feeling operands M1 for the respective character types are associated with an event in which the self-propelled cleaner 1 has returned to the battery charging dock 40 (normal termination) (hereinafter, referred to as "return success event"). Moreover, feeling operands M1 for the respective character types are associated with an event in which the self-propelled cleaner 1 has not returned to the battery charging dock 40 (abnormal termination) (hereinafter, referred to as "return failure event").

Note that the return failure event occurs when the self-propelled cleaner 1 stops due to shortage of the remaining battery while returning or when the self-propelled cleaner 1 could not return due to an obstacle existing in the returning path.

(Configuration of Control Section)

The control section 52 of the present embodiment includes an event detecting section 103 (event detecting means), a feeling selecting section 207 (operation mode selecting means), a return control section 404 (movement control means), and a response operation control section 301.

When cleaning is completed or when the remaining battery level becomes lower than a predetermined level, the return control section 404 controls the driving wheels 29 via the traveling driver section 58 such that the self-propelled cleaner 1 moves to be connected with the power supply terminals 41 of the battery charging dock 40 (i.e., to return to the battery charging dock 40).

The event detecting section 103 judges whether or not the self-propelled cleaner 1 has returned to the battery charging dock 40 as a result of the return control by the return control section 404. In a case where the self-propelled cleaner 1 has returned to the battery charging dock 40, the event detecting section 103 detects the return success event. On the other hand, in a case where the self-propelled cleaner 1 has not returned to the battery charging dock 40, the event detecting section 103 detects the return failure event. Note that each of the return success event and the return failure event is one of events relating to cleaning.

The following description will discuss the feeling selecting section 207. The feeling selecting section 207 includes an operand determining section 237 and a feeling calculation section 251. When the event detecting section 103 has detected occurrence of an event, the operand determining section 237 obtains, from the event/operand storage section 578C, a feeling operand M1 which is used to carry out a response operation with respect to the event.

The following description will discuss a concrete example in which the data illustrated in FIG. 25 is stored in the event/operand storage section 578C. In a case where the return success event has been detected and the character of the self-propelled cleaner 1 is the feeling type, the operand determining section 237 obtains "20" as the feeling operand M1. Similarly, in a case where the character of the self-propelled cleaner 1 is the calm type, the operand determining section 237 obtains "14" as the feeling operand M1. Similarly, in a case where the character of the self-propelled cleaner 1 is the tolerant type, the operand determining section 237 obtains "10" as the feeling operand M1.

On the other hand, in a case where the return failure event has been detected and the character of the self-propelled cleaner 1 is the feeling type, the operand determining section 237 obtains "−20" as the feeling operand M1. Similarly, in a case where the character of the self-propelled cleaner 1 is the calm type, the operand determining section 237 obtains "−14" as the feeling operand M1. Similarly, in a case where the character of the self-propelled cleaner 1 is the tolerant type, the operand determining section 237 obtains "−10" as the feeling operand M1.

(Process Flow)

A flow of processes carried out in the present embodiment is substantially identical with the flow of processes carried out in the self-propelled cleaner 1 of Embodiment 1, except that (i) the event detecting section 103 detects an event instead of the event detecting section 101 and (ii) the operand determining section 237 determines a feeling operand M1 instead of the operand determining section 231. Therefore, the flow of processes carried out in the present embodiment is not repeatedly described here.

Embodiment 8

Figure 26:
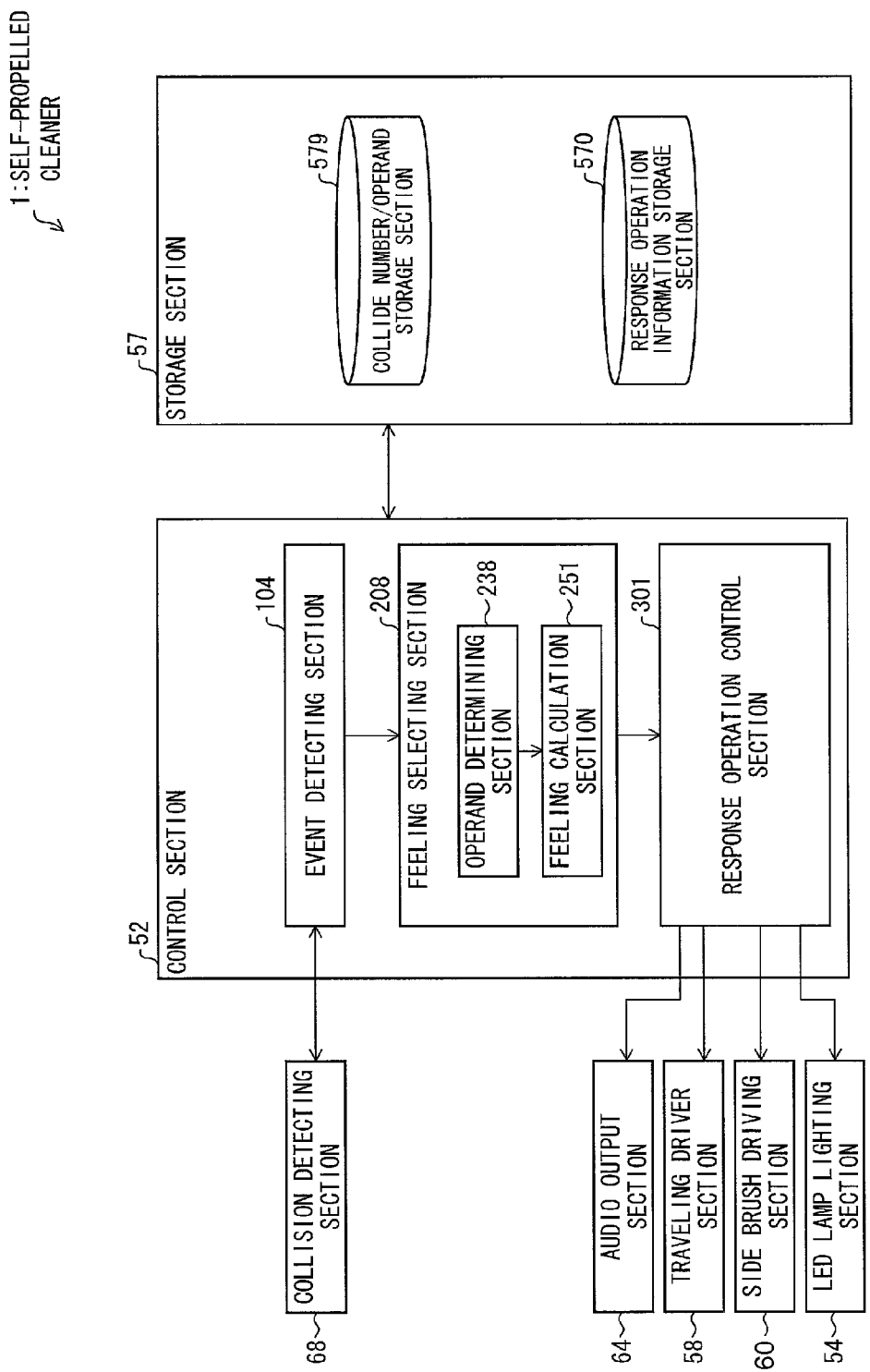
FIG. 26 is a block diagram illustrating a configuration of a storage section and a control section of a self-propelled cleaner in accordance with yet another embodiment of the present invention.
Figure 27:
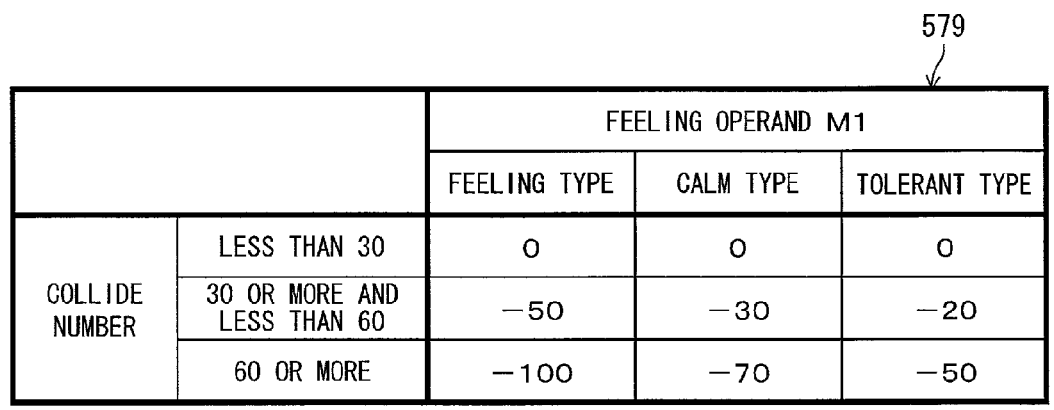
FIG. 27 is a view schematically illustrating an example of data stored in a collide number/operand storage section included in the storage section.

The following description will discuss yet another embodiment of the present invention, with reference to FIG. 26 and FIG. 27. For convenience of explanation, the same reference numerals are given to members having functions identical to those described in Embodiments 1 through 7, and descriptions of such members are omitted unless otherwise noted.

The following description will discuss configurations of a storage section 57 and a control section 52 of a self-propelled cleaner 1 in accordance with the present embodiment, with reference to FIG. 26. FIG. 26 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes a collide number/operand storage section 579 and a response operation information storage section 570.

The collide number/operand storage section 579 stores the number of times by which the self-propelled cleaner 1 collides with a wall or an obstacle during cleaning (hereinafter, referred to as "collide number") and a feeling operand M1 so that the collide number and the feeling operand M1 are associated with each other. In a case of a configuration in which a character type of the self-propelled cleaner 1 can be set, the feeling operand M1, which is associated with the collide number, can be stored for each character type. Note that data stored in the collide number/operand storage section 579 can be set in advance or set by the user.

The following description will discuss an example of data stored in the collide number/operand storage section 579, with reference to FIG. 27. FIG. 27 is a view schematically illustrating an example of data stored in the collide number/operand storage section 579. According to the example illustrated in FIG. 27, three levels of collide number, i.e., "less than 30", "30 or more and less than 60", and "60 or more" are set, and feeling operands M1 for each character type are set for the respective levels.

(Configuration of Control Section)

The control section 52 of the present embodiment includes an event detecting section 104, a feeling selecting section 208, and a response operation control section 301.

The event detecting section 104 (i) instructs, when the self-propelled cleaner 1 starts cleaning, the collision detecting section 68 to detect collision and (ii) counts the collide number when an event occurs in which the collision detecting section 68 has detected collision (hereinafter, referred to as "collision event"). Moreover, when the cleaning is completed, the event detecting section 104 resets the counted collide number to an initial value (normally, "0"). Note that the collision event is one of events relating to cleaning.

The feeling selecting section 208 includes an operand determining section 238 and a feeling calculation section 251. The operand determining section 238 obtains, from the collide number/operand storage section 579, a feeling operand M1 which is associated with the collide number which is counted by the event detecting section 104 when the collision event occurs.

The following description will discuss a concrete example in which the data illustrated in FIG. 27 is stored in the collide number/operand storage section 579. In a case where the collide number is 30 or more and less than 60 and the character of the self-propelled cleaner 1 is the feeling type, the operand determining section 238 obtains "−50" as the feeling operand M1. Similarly, in a case where the collide number is 30 or more and less than 60 and the character of the self-propelled cleaner 1 is the calm type, the operand determining section 238 obtains "−30" as the feeling operand M1. Similarly, in a case where the collide number is 30 or more and less than 60 and the character of the self-propelled cleaner 1 is the tolerant type, the operand determining section 238 obtains "−20" as the feeling operand M1.

(Process Flow)

A flow of processes carried out in the present embodiment is substantially identical with the flow of processes carried out in the self-propelled cleaner 1 of Embodiment 1, except that the operand determining section 238 determines the feeling operand M1 instead of the operand determining section 231. Therefore, the flow of processes carried out in the present embodiment is not repeatedly described here.

Embodiment 9

Figure 28:
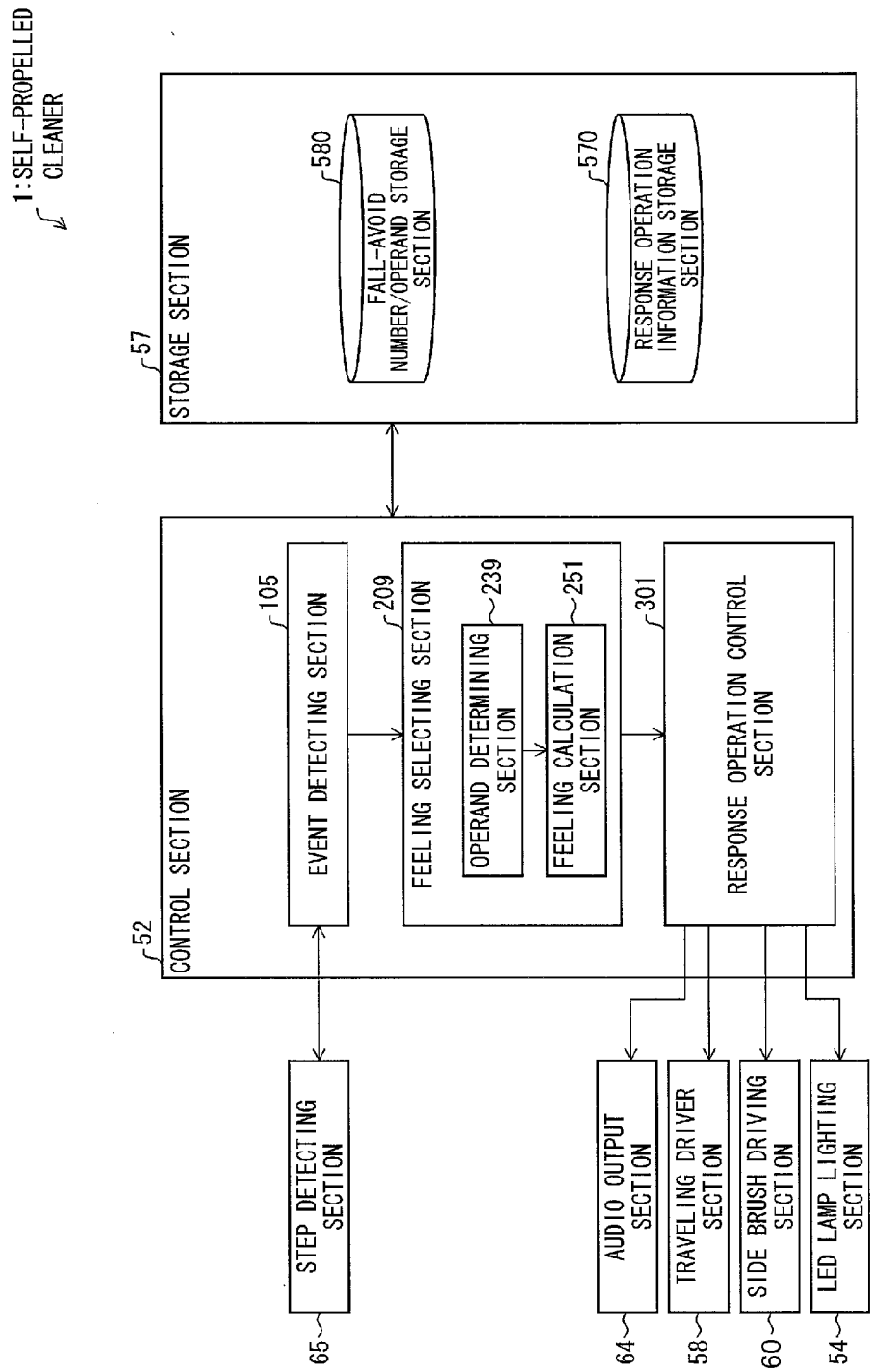
FIG. 28 is a block diagram illustrating a configuration of a storage section and a control section of a self-propelled cleaner in accordance with yet another embodiment of the present invention.

The following description will discuss yet another embodiment of the present invention, with reference to FIG. 28 and FIG. 29. For convenience of explanation, the same reference numerals are given to members having functions identical to those described in Embodiments 1 through 8, and descriptions of such members are omitted unless otherwise noted.

The following description will discuss configurations of a storage section 57 and a control section 52 of a self-propelled cleaner 1 in accordance with the present embodiment, with reference to FIG. 28. FIG. 28 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes a fall-avoid number/operand storage section 580 and a response operation information storage section 570.

The fall-avoid number/operand storage section 580 stores the number of times by which the self-propelled cleaner avoids falling from a step (hereinafter, referred to as "fall-avoid number") and a feeling operand M1 so that the fall-avoid number and the feeling operand M1 are associated with each other. In a case of a configuration in which a character type of the self-propelled cleaner 1 can be set, the feeling operand M1, which is associated with the fall-avoid number, can be stored for each character type. Note that data stored in the fall-avoid number/operand storage section 580 can be set in advance or set by the user.

The following description will discuss an example of data stored in the fall-avoid number/operand storage section 580, with reference to FIG. 29. FIG. 29 is a view schematically illustrating an example of data stored in the fall-avoid number/operand storage section 580. According to the example illustrated in FIG. 29, three levels of fall-avoid number, i.e., "less than 4", "4 or more and less than 7", and "7 or more" are set, and feeling operands M1 for each character type are set for the respective levels.

(Configuration of Control Section)

The control section 52 of the present embodiment includes an event detecting section 105, a feeling selecting section 209, and a response operation control section 301.

The event detecting section 105 (i) instructs, when the self-propelled cleaner 1 starts cleaning, the step detecting section 65 to detect a step and (ii) counts the fall-avoid number when an event occurs in which the self-propelled cleaner 1 avoids falling by the step detecting section 65 having detected the step (hereinafter, referred to as "fall-avoid event"). Moreover, when the cleaning is completed, the event detecting section 105 resets the counted fall-avoid number to an initial value (normally, "0"). Note that the fall-avoid event is one of events relating to cleaning.

The feeling selecting section 209 includes an operand determining section 239 and a feeling calculation section 251. The operand determining section 239 obtains, from the fall-avoid number/operand storage section 580, a feeling operand M1 which is associated with the fall-avoid number counted by the event detecting section 105 when the fall-avoid event occurs.

The following description will discuss a concrete example in which the data illustrated in FIG. 29 is stored in the fall-avoid number/operand storage section 580. In a case where the fall-avoid number is 4 or more and less than 7 and the character of the self-propelled cleaner 1 is the feeling type, the operand determining section 239 obtains "−50" as the feeling operand M1. Similarly, in a case where the fall-avoid number is 4 or more and less than 7 and the character of the self-propelled cleaner 1 is the calm type, the operand determining section 239 obtains "−30" as the feeling operand M1. Similarly, in a case where the fall-avoid number is 4 or more and less than 7 and the character of the self-propelled cleaner 1 is the tolerant type, the operand determining section 239 obtains "−20" as the feeling operand M1.

(Process Flow)

A flow of processes carried out in the present embodiment is substantially identical with the flow of processes carried out in the self-propelled cleaner 1 of Embodiment 1, except that (i) the event detecting section 105 detects an event instead of the event detecting section 101 and (ii) the operand determining section 239 determines a feeling operand M1 instead of the operand determining section 231. Therefore, the flow of processes carried out in the present embodiment is not repeatedly described here.

Embodiment 10

Figure 30:
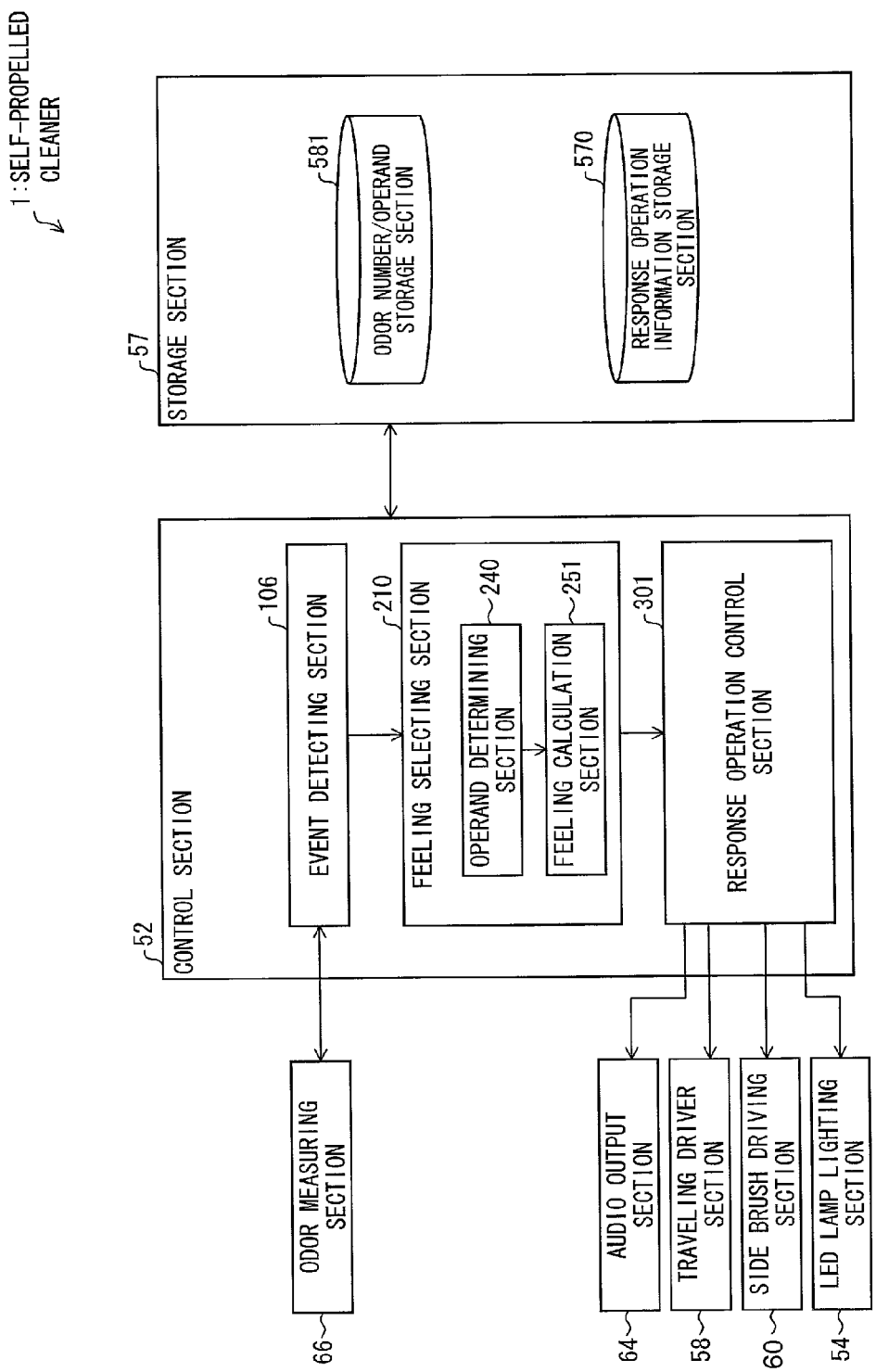
FIG. 30 is a block diagram illustrating a configuration of a storage section and a control section of a self-propelled cleaner in accordance with yet another embodiment of the present invention.

The following description will discuss yet another embodiment of the present invention, with reference to FIG. 30 and FIG. 31. For convenience of explanation, the same reference numerals are given to members having functions identical to those described in Embodiments 1 through 9, and descriptions of such members are omitted unless otherwise noted.

The following description will discuss configurations of a storage section 57 and a control section 52 of a self-propelled cleaner 1 in accordance with the present embodiment, with reference to FIG. 30. FIG. 30 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

The storage section 57 of the present embodiment includes an odor number/operand storage section 581 and a response operation information storage section 570.

The odor number/operand storage section 581 stores the number of times (hereinafter, referred to as "odor number") by which odor, which exceeds a predetermined level, is detected while the self-propelled cleaner 1 is traveling and a feeling operand M1 so that the odor number and the feeling operand M1 are associated with each other. In a case of a configuration in which a character type of the self-propelled cleaner 1 can be set, the feeling operand M1, which is associated with the odor number, can be stored for each character type. Note that data stored in the odor number/operand storage section 581 can be set in advance or set by the user.

The following description will discuss an example of data stored in the odor number/operand storage section 581, with reference to FIG. 31. FIG. 31 is a view schematically illustrating an example of data stored in the odor number/operand storage section 581. According to the example illustrated in FIG. 31, three levels of odor number, i.e., "less than 3", "3 or more and less than 5", and "5 or more" are set, and feeling operands M1 for each character type are set for the respective levels.

(Configuration of Control Section)

The control section 52 of the present embodiment includes an event detecting section 106, a feeling selecting section 210, and a response operation control section 301.

The event detecting section 106 (i) instructs, when the self-propelled cleaner 1 starts cleaning, the odor measuring section 66 to measure odor and (ii) counts the odor number when an event occurs in which the odor measuring section 66 has measured odor which exceeds the predetermined level (hereinafter, referred to as "odor event"). Moreover, when the cleaning is completed, the event detecting section 106 resets the counted odor number to an initial value (normally, "0"). Note that the odor event is one of events relating to cleaning.

The feeling selecting section 211 includes an operand determining section 240 and a feeling calculation section 251. The operand determining section 240 obtains, from the odor number/operand storage section 581, a feeling operand M1 which is associated with the odor number counted by the event detecting section 106 when the odor event occurs.

The following description will discuss a concrete example in which the data illustrated in FIG. 31 is stored in the odor number/operand storage section 581. In a case where the odor number is 3 or more and less than 5 and the character of the self-propelled cleaner 1 is the feeling type, the operand determining section 240 obtains "−50" as the feeling operand M1. Similarly, in a case where the odor number is 3 or more and less than 5 and the character of the self-propelled cleaner 1 is the calm type, the operand determining section 240 obtains "−30" as the feeling operand M1. Similarly, in a case where the odor number is 3 or more and less than 5 and the character of the self-propelled cleaner 1 is the tolerant type, the operand determining section 240 obtains "−20" as the feeling operand M1.

(Process Flow)

A flow of processes carried out in the present embodiment is substantially identical with the flow of processes carried out in the self-propelled cleaner 1 of Embodiment 1, except that (i) the event detecting section 106 detects an event instead of the event detecting section 101 and (ii) the operand determining section 240 determines a feeling operand M1 instead of the operand determining section 231. Therefore, the flow of processes carried out in the present embodiment is not repeatedly described here.

Embodiment 11

Figure 32:
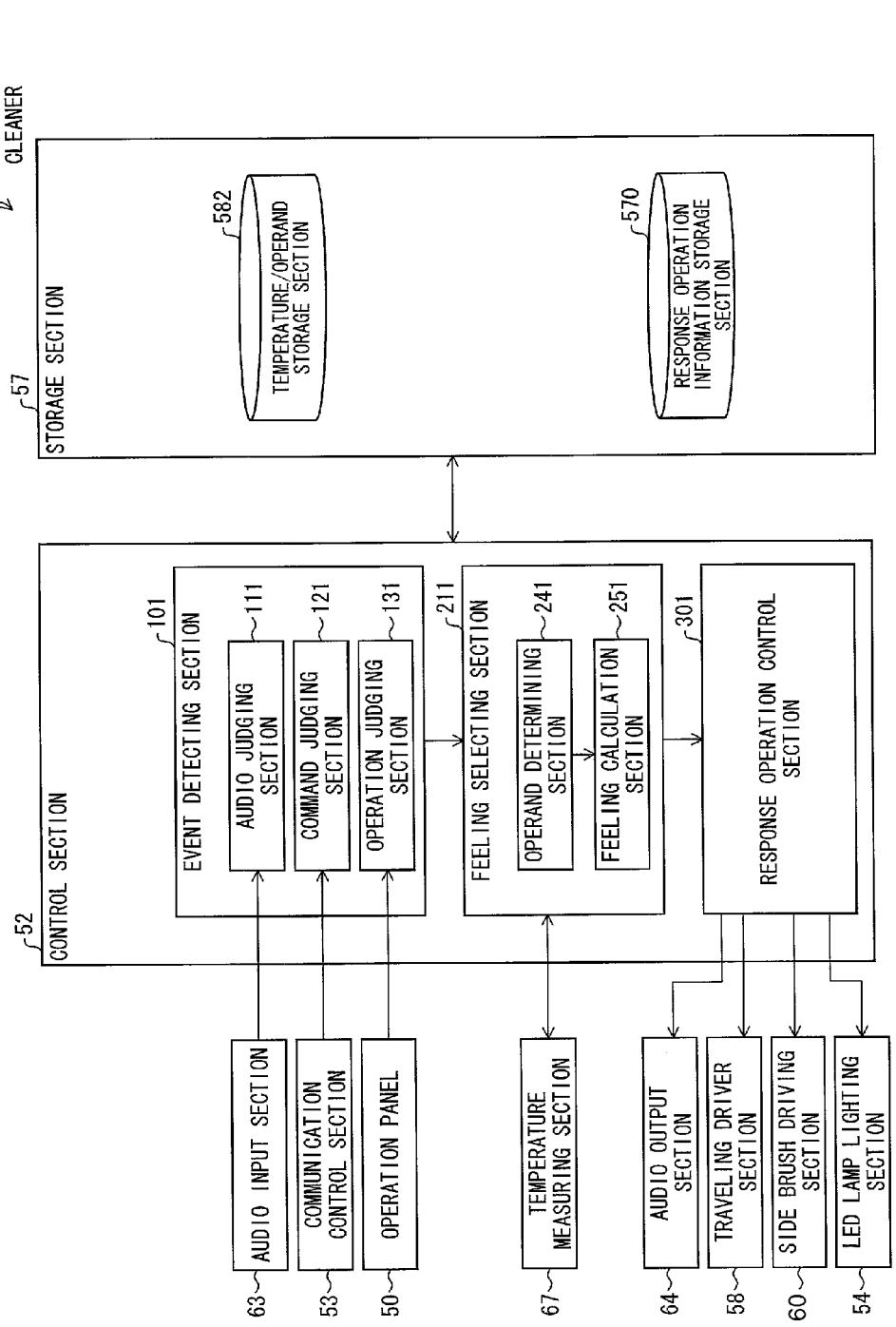
FIG. 32 is a block diagram illustrating a configuration of a storage section and a control section of a self-propelled cleaner in accordance with yet another embodiment of the present invention.

The following description will discuss yet another embodiment of the present invention, with reference to FIG. 32 and FIG. 33. For convenience of explanation, the same reference numerals are given to members having functions identical to those described in Embodiments 1 through 10, and descriptions of such members are omitted unless otherwise noted.

The following description will discuss configurations of a storage section 57 and a control section 52 of a self-propelled cleaner 1 in accordance with the present embodiment, with reference to FIG. 32. FIG. 32 is a block diagram illustrating configurations of the storage section 57 and the control section 52 of the self-propelled cleaner 1 in accordance with the present embodiment. Note that the configuration of the self-propelled cleaner 1 of the present embodiment is substantially identical with the self-propelled cleaner 1 of Embodiment 1, except for the storage section 57 and the control section 52.

(Configuration of Storage Section)

The storage section 57 of the present embodiment includes a temperature/operand storage section 582 and a response operation information storage section 570.

The temperature/operand storage section 582 stores a temperature and a feeling operand M1 so that the temperature and the feeling operand M1 are associated with each other. In a case of a configuration in which a character type of the self-propelled cleaner 1 can be set, the feeling operand M1, which is associated with the temperature, can be stored for each character type. Note that data stored in the temperature/operand storage section 582 can be set in advance or set by the user.

The following description will discuss an example of data stored in the temperature/operand storage section 582, with reference to FIG. 33. FIG. 33 is a view schematically illustrating an example of data stored in the temperature/operand storage section 582. According to the example illustrated in FIG. 33, three levels of temperature, i.e., "lower than 13° C.", "13° C. or higher and lower than 30° C.", and "30° C. or higher" are set, and feeling operands M1 for each character type are set for the respective levels.

(Configuration of Control Section)

The control section 52 of the present embodiment includes an event detecting section 101, a feeling selecting section 211, and a response operation control section 301.

At every predetermined period from when the event detecting section 101 detected occurrence of an event, the feeling selecting section 211 selects, in accordance with a temperature around the self-propelled cleaner 1, one of "good mood", "normal", and "bad mood" as a feeling with which the self-propelled cleaner 1 carries out a response operation with respect to the event. Note that the temperature around the self-propelled cleaner 1 is information relating to cleaning which can be measured by the self-propelled cleaner 1.

The feeling selecting section 211 includes an operand determining section 241 and a feeling calculation section 251. The operand determining section 241 requests the temperature measuring section 67 to measure a temperature at every predetermined period and thus obtains the temperature measured by the temperature measuring section 67. Further, the operand determining section 241 obtains a feeling operand M1 which is stored in the temperature/operand storage section 582 while being associated with the obtained temperature.

The following description will discuss a concrete example in which the data illustrated in FIG. 33 is stored in the temperature/operand storage section 582. In a case where the temperature is lower than 13° C. and the character of the self-propelled cleaner 1 is the feeling type, the operand determining section 241 obtains "−150" as the feeling operand M1. Similarly, in a case where the temperature is lower than 13° C. and the character of the self-propelled cleaner 1 is the calm type, the operand determining section 241 obtains "−100" as the feeling operand M1. Similarly, in a case where the temperature is lower than 13° C. and the character of the self-propelled cleaner 1 is the tolerant type, the operand determining section 241 obtains "−50" as the feeling operand M1.

(Process Flow)

A flow of processes carried out in the present embodiment is substantially identical with the flow of processes carried out in the self-propelled cleaner 1 of Embodiment 1 except that the operand determining section 241 determines the feeling operand M1 instead of the operand determining section 231. Therefore, the flow of processes carried out in the present embodiment is not repeatedly described here.

Modification Example

In each of the embodiments above, the "normal" or the "bad mood" can be selected as the feeling of the self-propelled cleaner 1. However, for example, on a happy day (e.g., birthday) for the user, it is preferable that the feeling of the self-propelled cleaner 1 is "good mood".

Under the circumstances, it is possible to employ a configuration in which, when a system date on which each of the feeling selecting sections 201 through 211 selects the feeling matches a day which has been registered on the self-propelled cleaner 1 by the user in advance, an exceptional process is carried out in which the feeling operand M1 stored in the storage section 57 is not obtained but a feeling value M is set to a predetermined large value so that the feeling is set to the "good mood".

This makes it possible to set a day on which the feeling of the self-propelled cleaner 1 is surely set to the "good mood" in accordance with the setting by the user.

[Combination of Embodiments]

An embodiment derived from a proper combination of technical means disclosed in respective different embodiments is also encompassed in the technical scope of the present invention.

That is, the feeling of the self-propelled cleaner 1 can be selected based on some or all of the following (1) through (11): i.e., (1) a frequency of cleaning, (2) a remaining battery level of the battery 14, (3) an amount of dust contained in the dust collection section 30, (4) an elapsed time from when the event occurred, (5) an operation instruction to the self-propelled cleaner 1, (6) detachment of the dust collection section 30, (7) success and failure in returning to the battery charging dock 40, (8) collision with an obstacle, (9) avoidance of falling, (10) ambient odor, and (11) ambient temperature.

That is, each of the control section 52 and the storage section 57 can be configured to concurrently include the blocks described in Embodiments 1 through 11. In a case where the control section 52 is configured to include two or more of the feeling selecting sections 201 through 211, a plurality of feeling operands M1 can be determined. In this case, a feeling operand M1 can be determined in accordance with a predetermined priority or condition.

[Application to Other Electronic Apparatuses]

The technical idea that a feeling of a device is determined based on various information which can be measured by the device or on an event occurred in the device can be applied to an electronic apparatus other than the cleaner. For example, the technical idea is applicable to electronic apparatuses such as an air purifier, a humidifier, and a dehumidifier.

[Form of Control Section]

Lastly, the control section 52 of the self-propelled cleaner 1 can be configured by hardware with the use of a logic circuit formed on an integrated circuit (IC chip) or by software with the use of CPU.

In the case of being configured by software, the self-propelled cleaner 1 includes a CPU, a ROM (Read Only Memory), a RAM (Random Access Memory), and a storage device (storage medium) such as a memory. The CPU executes instructions of control programs for realizing the functions. In the ROM, the programs are stored. Into the RAM, the programs are loaded. In the storage device, the programs and various data are stored. The objective of the present invention can also be achieved, by (i) supplying a storage medium, in which program codes (executable programs, intermediate code programs, source programs) of programs for controlling the self-propelled cleaner 1 configured by software for realizing the functions, are stored so that a computer can read them, to the self-propelled cleaner 1, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; a semiconductor memory such as a mask ROM, EPROM, EEPROM (Registered Trademark), or flash ROM; or a logic circuit such as PLD (Programmable Logic Device).

Alternatively, the self-propelled cleaner 1 can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one. The transfer medium can be, for example, wired line such as IEEE 1394, USB, electric power line, cable TV line, telephone line, or ADSL line; or wireless such as infrared radiation (IrDA, remote control), Bluetooth (Registered Trademark), IEEE 802.11 wireless, HDR (High Data Rate), NFC (Near Field Communication), DLNA (Digital Living Network Alliance), mobile telephone network, satellite line, or terrestrial digital network.

As such, in this specification, the means do not necessarily indicate physical means and the functions of the means can be realized by software. Furthermore, a function of one (1) means can be realized by two or more physical means, and functions of two or more means can be realized by one (1) physical means.

The present invention is not limited to the embodiments, but can be altered by a skilled person in the art within the scope of the claims. An embodiment derived from a proper combination of technical means disclosed in respective different embodiments is also encompassed in the technical scope of the present invention.

In order to attain the object, the cleaner of the present invention for carrying out cleaning includes: event detecting means for detecting an event which relates to cleaning and has occurred in the cleaner; operation mode selecting means for selecting, from a plurality of options, an operation mode with which the cleaner carries out an operation in response to the event detected by the event detecting means, the operation mode selecting means selecting the operation mode in accordance with measured information which relates to the cleaning and is measured by the cleaner; an operation storage section in which the event, the operation mode, and operation information indicative of the operation are stored so that the event, the operation mode, and the operation information are associated with each other; and operation control means for controlling the cleaner to carry out the operation based on the operation information which is stored in the operation storage section while being associated with the event that has been detected by the event detecting means and with the operation mode that has been selected by the operation mode selecting means.

According to the configuration, the event, which relates to cleaning, is detected by the cleaner. Then, an operation mode, with which the cleaner carries out an operation in response to the event thus detected, is selected from a plurality of options in accordance with measured information which can be measured by the cleaner and relates to cleaning. Then, the cleaner is controlled to carry out the operation in accordance with the operation information which is associated with the detected event and the selected operation mode.

As such, when an event relating to cleaning has occurred, an operation mode is selected in accordance with measured information relating to the cleaning, and a response operation with respect to the event can be carried out in accordance with operation information associated with the operation mode. Here, assuming that the operation mode is "feeling" of the cleaner, the response operation with respect to the event can be assumed to be carried out in accordance with the feeling selected in accordance with measured information relating to the cleaning.

Therefore, the cleaner of the present invention can bring about an effect of carrying out the response operation in accordance with the feeling selected based on the information relating to cleaning.

It is possible that the cleaner of the present invention further includes: cleaning number storage section in which the number of times of cleaning is stored for each day; and cleaning number storing means for updating the number of times, which is stored in the cleaning number storage section while being associated with a date on which the cleaning has been carried out, by increasing the number of times by 1 each time cleaning is carried out, the measured information, based on which the operation mode selecting means selects the operation mode, being a total of the number of times which is stored in the cleaning number storage section while being associated with a day(s) within a predetermined period.

According to the configuration, the number of times of cleaning is updated, which is associated with a day on which the cleaning has been carried out, by being increased by 1 each time cleaning is carried out. Then, the operation mode is selected based on the measured information which is the total of the number of times associated with the day within the predetermined period.

As such, the operation mode is selected in accordance with the total number of times by which cleaning has been carried out within the predetermined period, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the total number of times by which cleaning has been carried out within the predetermined period.

It is possible that the cleaner of the present invention further includes: a cleaning day storage section in which a day on which cleaning has been carried out is stored; and cleaning-day number storing means for causing the cleaning day storage section to store the day on which cleaning has been carried out, the measured information, based on which the operation mode selecting means selects the operation mode, being a total of days on which cleaning has been carried out within a predetermined period and which are stored in the cleaning day storage section.

According to the configuration, the operation mode is selected based on the measured information which is the total number of days, on which cleaning has been carried out, within the predetermined period.

As such, the operation mode is selected in accordance with the total number of days, on which cleaning has been carried out, within the predetermined period, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the total number of days, on which cleaning has been carried out, within the predetermined period.

It is possible that the cleaner of the present invention further includes: a secondary battery which is an electric power source for supplying electric power to the cleaner; and remaining battery measuring means for measuring a remaining battery level of the secondary battery, the measured information, based on which the operation mode selecting means selects the operation mode, being the remaining battery level which has been measured by the remaining battery measuring means.

According to the configuration, the operation mode is selected based on the measured information which is the remaining battery level of the secondary battery.

As such, the operation mode is selected in accordance with the remaining battery level of the secondary battery, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the remaining battery level of the secondary battery.

It is possible that the cleaner of the present invention further includes: a motor for sucking dust; and electric current measuring means for measuring an electric current of the motor, the measured information, based on which the operation mode selecting means selects the operation mode, being the electric current which has been measured by the electric current measuring means.

According to the configuration, the operation mode is selected based on the measured information which is the electric current of the motor for sucking dust.

As such, the operation mode is selected in accordance with the electric current of the motor, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the electric current of the motor.

In order to attain the object, the cleaner of the present invention for carrying out cleaning includes: event detecting means for detecting an event which relates to cleaning and has occurred in the cleaner; operation mode selecting means for selecting, from a plurality of options, an operation mode with which the cleaner carries out an operation in response to the event detected by the event detecting means, the operation mode selecting means selecting the operation mode in accordance with the event; an operation storage section in which the event, the operation mode, and operation information indicative of the operation are stored so that the event, the operation mode, and the operation information are associated with each other; and operation control means for controlling the cleaner to carry out the operation based on the operation information which is stored in the operation storage section while being associated with the event that has been detected by the event detecting means and with the operation mode that has been selected by the operation mode selecting means.

According to the configuration, the event, which relates to cleaning, is detected by the cleaner. Then, an operation mode, with which the cleaner carries out an operation in response to the event thus detected, is selected from a plurality of options in accordance with the event. Then, the cleaner is controlled to carry out the operation in accordance with the operation information which is associated with the detected event and the selected operation mode.

As such, when an event relating to cleaning has occurred, an operation mode is selected in accordance with the event, and a response operation in response to the event can be carried out in accordance with operation information associated with the operation mode. Here, assuming that the operation mode is "feeling" of the cleaner, the response operation in response to the event can be assumed to be carried out in accordance with the feeling selected in accordance with measured information relating to the cleaning.

Therefore, the cleaner of the present invention can bring about an effect of carrying out the response operation in accordance with the feeling selected based on the event relating to cleaning.

It is possible that the cleaner of the present invention further includes: communication control means for receiving a control signal from an external device, the event being reception of a control signal by the communication control means, the control signal being indicative of an operation instruction to the cleaner.

As such, the operation mode is selected in accordance with the reception of the control signal indicative of the operation instruction, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the reception of the control signal indicative of the operation instruction.

It is possible that the cleaner of the present invention further includes: a dust collection section for collecting dust, the dust collection section being detachably provided, the event being detachment of the dust collection section.

As such, the operation mode is selected in accordance with the detachment of the dust collection section, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the detachment of the dust collection section.

It is possible that the cleaner of the present invention further includes: a secondary battery which is an electric power source for supplying electric power to the cleaner; and movement control means for controlling the cleaner to move to be electrically connected with a battery charging dock for charging the secondary battery, the event being connection between the battery charging dock and the cleaner which has been controlled to move by the movement control means.

As such, the operation mode is selected in accordance with the event of success in returning to the battery charging dock, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the event of success in returning to the battery charging dock.

It is possible that the cleaner of the present invention further includes: a secondary battery which is an electric power source for supplying electric power to the cleaner; and movement control means for controlling the cleaner to move to be connected with a battery charging dock for charging the secondary battery, the event being a failure of connection between the battery charging dock and the cleaner which has been controlled to move by the movement control means.

As such, the operation mode is selected in accordance with the event of failure in returning to the battery charging dock, and the response operation in response to the event can be carried out in accordance with the operation information associated with the operation mode.

Further, in a case where the operation mode is assumed to be "feeling" of the cleaner, it is possible to bring about an effect of carrying out the response operation in accordance with a feeling which has been selected based on the event of failure in returning to the battery charging dock.

Note that the cleaner can be realized by a computer. In such a case, the present invention encompasses (i) a control program of the cleaner which control program causes the computer to serve as the above described means for realizing the cleaner and (ii) a computer-readable storage medium storing the control program.

INDUSTRIAL APPLICABILITY

The present invention is applicable to a cleaner. In particular, the present invention is suitably applicable to a self-propelled cleaner.

REFERENCE SIGNS LIST

1: Self-propelled cleaner (cleaner)
10: Side brush
14: Battery (secondary battery)
20: Motor unit (motor)
29: Driving wheel
30: Dust collection section
50: Operation panel
51: LED lamp
53: Communication control section (communication control means)
63: Audio input section
64: Audio output section
101 through 106: Event detecting section (event detecting means)
201 through 211: Feeling selecting section (operation mode selecting means)
301: Response operation control section (operation control means)
401: Cleaning record information storage section (cleaning number storing means, cleaning-day number storing means)
402: Remaining battery measuring section (remaining battery measuring means)
403: Electric current measuring section (electric current measuring means)
404: Return control section (movement control means)
570: Response operation information storage section (operation storage section)
571: Cleaning number storage section
572: Cleaning-day number storage section
573: Cleaning number/operand storage section
574: Cleaning-day number/operand storage section
575: Remaining battery/operand storage section
576: Electric current/operand storage section
577: Elapsed time/operand storage section
578A: Event/operand storage section
578B: Event/operand storage section
578C: Event/operand storage section

The invention claimed is:

1. A cleaner that carries out cleaning, comprising:
event detecting circuitry that detects an event which relates to cleaning and has occurred in said cleaner;
operation mode selecting circuitry that selects, from a plurality of options, an operation mode with which said cleaner carries out an operation in response to the event detected by the event detecting circuitry, the operation mode selecting circuitry selecting the operation mode in accordance with measured information which relates to the cleaning and is measured by said cleaner and with an elapsed time from when a previous calculation was performed to select a previous operation mode;
an operation storage in which the event, the operation mode, and operation information indicative of the operation are stored so that the event, the operation mode, and the operation information are associated with each other; and
operation control circuitry that controls said cleaner to carry out the operation based on the operation information which is stored in the operation storage while being associated with the event that has been detected by the event detecting circuitry and with the operation mode that has been selected by the operation mode selecting circuitry.

2. The cleaner as set forth in claim 1, further comprising:
a cleaning number storage in which a number of times of cleaning is stored for each day; and
cleaning number update circuitry that updates the number of times, which is stored in the cleaning number storage while being associated with a date on which the cleaning is carried out, by increasing the number of times by 1 each time cleaning is carried out, wherein
the measured information, based on which the operation mode selecting circuitry selects the operation mode, is a total of the number of times which is stored in the cleaning number storage while being associated with a day(s) within a predetermined period.

3. The cleaner as set forth in claim 1, further comprising:
a cleaning day storage in which a day on which cleaning has been carried out is stored; and
cleaning-day number storing circuitry that causes the cleaning day storage to store the day on which cleaning has been carried out, wherein
the measured information, based on which operation mode the operation mode selecting circuitry selects, is a total of days on which cleaning has been carried out within a predetermined period and which are stored in the cleaning day storage.

4. The cleaner as set forth in claim 1, further comprising:
a secondary battery which is an electric power source that supplies electric power to said cleaner; and
remaining battery measuring circuitry that measures a remaining battery level of the secondary battery, wherein the measured information, based on which the operation mode selecting circuitry selects the operation mode, is the remaining battery level which has been measured by the remaining battery measuring circuitry.

5. The cleaner as set forth in claim 1, further comprising:
a motor that suctions dust; and
electric current measuring circuitry that measures an electric current of the motor, wherein
the measured information, based on which the operation mode selecting circuitry selects the operation mode, is the electric current which has been measured by the electric current measuring circuitry.

6. A cleaner that carries out cleaning, comprising:
event detecting circuitry that detects an event which relates to cleaning and has occurred in said cleaner;
operation mode selecting circuitry that selects from a plurality of options, an operation mode with which said cleaner carries out an operation in response to the event detected by the event detecting circuitry, the operation mode selecting circuitry selecting the operation mode in accordance with the event and with an elapsed time from when a previous calculation was performed to select a previous operation mode;
an operation storage in which the event, the operation mode, and operation information indicative of the operation are stored so that the event, the operation mode, and the operation information are associated with each other; and
operation control circuitry that controls said cleaner to carry out the operation based on the operation information which is stored in the operation storage while being associated with the event that has been detected by the event detecting circuitry and with the operation mode that has been selected by the operation mode selecting circuitry.

7. The cleaner as set forth in claim 6, further comprising:
communication control circuitry that receives a control signal from an external device, wherein
the event is reception of a control signal by the communication control circuitry, the control signal being indicative of an operation instruction to said cleaner.

8. The cleaner as set forth in claim 6, further comprising:
a dust collector that collects dust, the dust collector being detachably provided,
the event being detachment of the dust collector.

9. The cleaner as set forth in claim 6, further comprising:
a secondary battery which is an electric power source that supplies electric power to said cleaner; and
movement control circuitry that controls said cleaner to move to be electrically connected with a battery charging dock that charges the secondary battery, wherein
the event is connection between the battery charging dock and said cleaner which has been controlled to move by the movement control circuitry.

10. The cleaner as set forth in claim 6, further comprising:
a secondary battery which is an electric power source that supplies electric power to said cleaner; and
movement control circuitry that controls said cleaner to move to be connected with a battery charging dock that charges the secondary battery, wherein
the event is a failure of connection between the battery charging dock and said cleaner which has been controlled to move by the movement control circuitry.

* * * * *